United States Patent
VandenBerg, III et al.

(10) Patent No.: US 10,611,384 B1
(45) Date of Patent: Apr. 7, 2020

(54) SYSTEMS AND METHODS FOR AUTONOMOUS VEHICLE OPERATOR VIGILANCE MANAGEMENT

(71) Applicant: UATC, LLC, San Francisco, CA (US)

(72) Inventors: Dirk John VandenBerg, III, Pittsburgh, PA (US); Benjamin Stanley Swears, Cheswick, PA (US)

(73) Assignee: UATC, LLC, San Francisco, CA (US)

( * ) Notice: Subject to any disclaimer, the term of this patent is extended or adjusted under 35 U.S.C. 154(b) by 0 days.

(21) Appl. No.: 16/104,253

(22) Filed: Aug. 17, 2018

Related U.S. Application Data

(60) Provisional application No. 62/711,044, filed on Jul. 27, 2018.

(51) Int. Cl.
*B60W 50/14* (2020.01)
*B60W 40/08* (2012.01)

(52) U.S. Cl.
CPC ........... *B60W 50/14* (2013.01); *B60W 40/08* (2013.01); *B60W 2050/146* (2013.01); *B60W 2540/26* (2013.01); *B60W 2710/30* (2013.01)

(58) Field of Classification Search
CPC .............. B60W 50/14; B60W 40/08; B60W 2050/146; B60W 2540/26; B60W 2710/30
See application file for complete search history.

(56) References Cited

U.S. PATENT DOCUMENTS

| | | | |
|---|---|---|---|
| 5,253,228 A | 10/1993 | Truett | |
| 6,575,902 B1* | 6/2003 | Burton | A61B 5/18 600/300 |
| 9,150,200 B2* | 10/2015 | Urhahne | B60W 50/16 |
| 2009/0010488 A1* | 1/2009 | Matsuoka | B60W 30/08 382/100 |
| 2009/0040874 A1* | 2/2009 | Rooney | A61J 7/0472 368/10 |
| 2011/0241862 A1* | 10/2011 | Debouk | B60W 50/038 340/439 |

(Continued)

OTHER PUBLICATIONS

U.S. Appl. No. 16/154,253, filed Oct. 8, 2018, Donnelly, et al., Vehicle Operator Awareness System.

(Continued)

*Primary Examiner* — Babar Sarwar
(74) *Attorney, Agent, or Firm* — Dority & Mannning, P.A.

(57) ABSTRACT

Systems and methods for managing autonomous vehicle operator vigilance are provided. A method can include determining, by a computing system comprising one or more processors, a first vigilance prompt. The first vigilance prompt can be included in a plurality of vigilance prompts. Each of the plurality of vigilance prompts can be different from each other vigilance prompt. Each vigilance prompt can be a prompt for the vehicle operator to perform a particular interaction with the autonomous vehicle. The method can further include providing, by the computing system, the first vigilance prompt to a vehicle operator of an autonomous vehicle. The method can further include receiving, by the computing system, a first response from the vehicle operator in response to the first vigilance prompt. The method can further include determining, by the computing system, a vehicle operator vigilance level based at least in part on the first response.

20 Claims, 8 Drawing Sheets

(56) References Cited

U.S. PATENT DOCUMENTS

| | | | |
|---|---|---|---|
| 2012/0083964 A1* | 4/2012 | Montemerlo | G05D 1/0214 |
| | | | 701/26 |
| 2013/0018549 A1* | 1/2013 | Kobana | B60K 28/06 |
| | | | 701/41 |
| 2013/0131907 A1* | 5/2013 | Green | G05D 1/0055 |
| | | | 701/23 |
| 2016/0202700 A1* | 7/2016 | Sprigg | B60Q 9/00 |
| | | | 701/23 |
| 2016/0214483 A1* | 7/2016 | Kleen | B60W 50/14 |
| 2017/0169398 A1* | 6/2017 | Washington | G06Q 10/1095 |
| 2017/0334453 A1* | 11/2017 | Mimura | B60W 10/20 |
| 2017/0334459 A1* | 11/2017 | McNew | B60W 50/14 |
| 2017/0349186 A1* | 12/2017 | Miller | B60W 50/082 |
| 2018/0194366 A1* | 7/2018 | Krishnan | B60W 50/10 |
| 2018/0281818 A1* | 10/2018 | Ebina | B60W 30/18009 |
| 2018/0290660 A1* | 10/2018 | Huang | B60W 50/14 |
| 2018/0348751 A1* | 12/2018 | Newman | B60W 50/10 |
| 2019/0009797 A1* | 1/2019 | Liu | G05D 1/0077 |
| 2019/0094856 A1* | 3/2019 | Kawate | B60R 21/00 |
| 2019/0129418 A1* | 5/2019 | Swan | B60W 40/08 |

OTHER PUBLICATIONS

U.S. Appl. No. 16/154,264, filed Oct. 8, 2018, Donnelly, et al., Vehicle Operator Awareness System.

\* cited by examiner

SYSTEMS AND METHODS FOR AUTONOMOUS VEHICLE OPERATOR VIGILANCE MANAGEMENT

PRIORITY CLAIM

The present application is based on and claims benefit of U.S. Provisional Application 62/711,044 having a filing date of Jul. 27, 2018, which is incorporated by reference herein.

FIELD

The present disclosure relates generally to devices, systems, and methods for managing autonomous vehicle operator vigilance.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a method for determining a vigilance level of a vehicle operator in an autonomous vehicle. The method can include determining, by a computing system comprising one or more processors, a first vigilance prompt. The first vigilance prompt can be included in a plurality of vigilance prompts. Each of the plurality of vigilance prompts can be different from each other vigilance prompt. Each vigilance prompt can be a prompt for the vehicle operator to perform a particular interaction with the autonomous vehicle. The method can further include providing, by the computing system, the first vigilance prompt to a vehicle operator of an autonomous vehicle. The method can further include receiving, by the computing system, a first response from the vehicle operator in response to the first vigilance prompt. The method can further include determining, by the computing system, a vehicle operator vigilance level based at least in part on the first response.

Another example aspect of the present disclosure is directed to an autonomous vehicle operator vigilance management system. The autonomous vehicle operator vigilance management system can include one or more processors and one or more tangible, non-transitory, computer readable media that collectively store instructions that when executed by the one or more processors cause the computing system to perform operations. The operations can include determining that a vehicle operator is ready to be provided a first vigilance prompt. The first vigilance prompt can be included in a plurality of vigilance prompts. Each of the plurality of vigilance prompts can be different from each other vigilance prompt. Each vigilance prompt can be a prompt for the vehicle operator to perform a particular interaction with the autonomous vehicle. The operations can further include determining the first vigilance prompt. The operations can further include providing the first vigilance prompt to the vehicle operator of the autonomous vehicle. The operations can further include receiving a first response from the vehicle operator in response to the first vigilance prompt.

Another example aspect of the present disclosure is directed to an autonomous vehicle configured to operate in a testing environment. The autonomous vehicle can include a touch-sensitive display screen, a speaker device, and one or more of vehicle operator input devices. The one or more vehicle operator input devices can include one or more of: a button, a shifter paddle, a turn indicator, a windshield wiper, a microphone, or the touch-sensitive display screen. The autonomous vehicle can further include a vehicle operator testing normalization system. The vehicle operator testing normalization system can include one or more processors; and one or more tangible, non-transitory, computer readable media that collectively store instructions that when executed by the one or more processors cause the computing system to perform operations. The operations can include providing a first vigilance prompt to a vehicle operator of the autonomous vehicle via at least one of the touch-sensitive display screen or the speaker device. The first vigilance prompt can be a prompt for the vehicle operator to perform a particular interaction with at least one vehicle operator input device. The operations can further include receiving a first response from the vehicle operator in response to the first vigilance prompt via the at least one vehicle operator device. The operations can further include determining a second vigilance prompt based at least in part on the first response. The second vigilance prompt can include a cognitive loading component. The operations can further include providing the second vigilance prompt to the vehicle operator of the autonomous vehicle.

Other aspects of the present disclosure are directed to various systems, apparatuses, non-transitory computer-readable media, vehicles, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
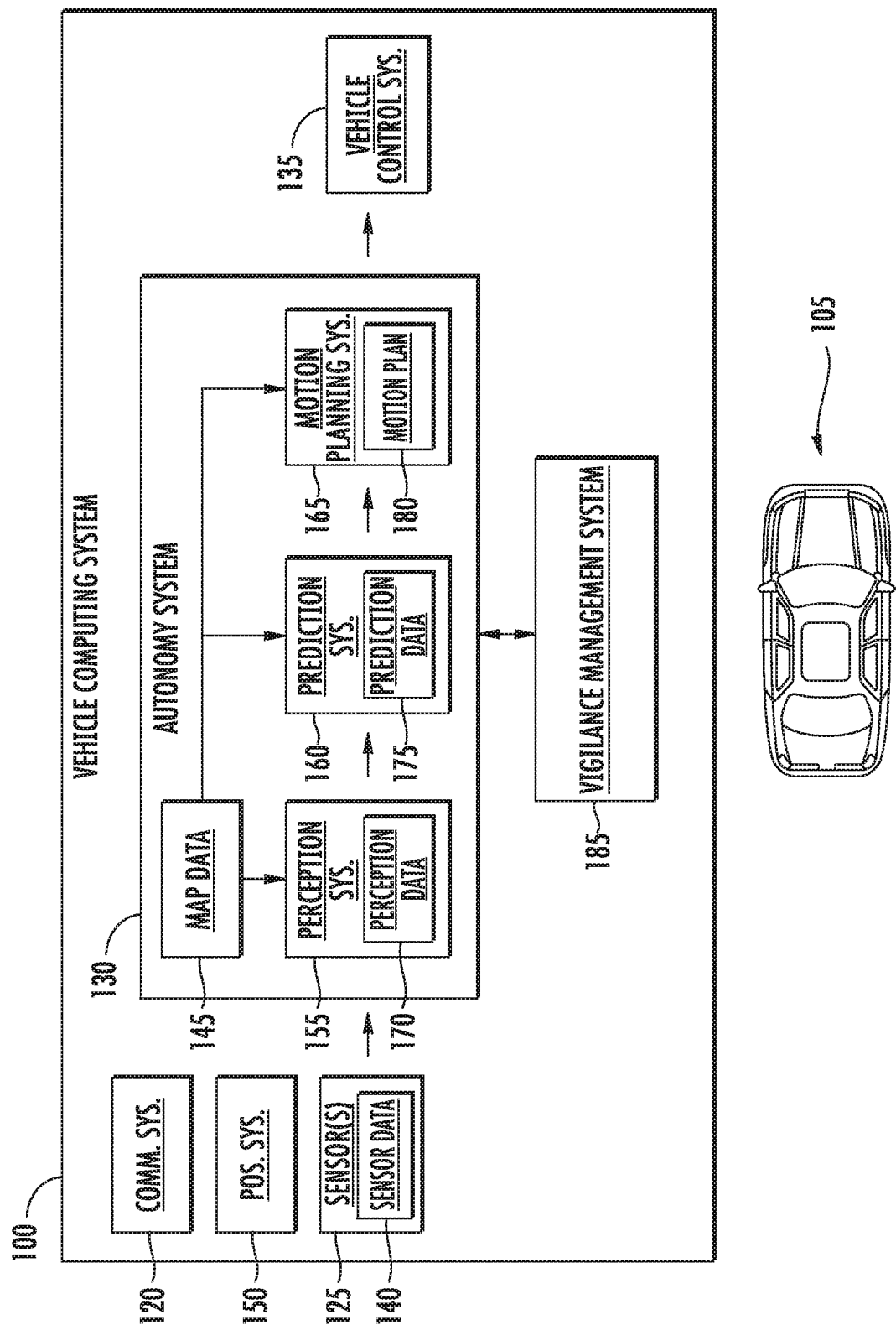
FIG. 1 depicts an example autonomous vehicle computing system according to example aspects of the present disclosure.

Example aspects of the present disclosure are directed to systems and methods for improving vehicle operator vigilance during autonomous vehicle driving sessions. An autonomous vehicle can drive, navigate, operate, etc. with minimal and/or no interaction from a human driver to provide a vehicle service. By way of example, an autonomous vehicle can be configured to provide transportation and/or other services, such as transporting a passenger from a first location to a second location. In some applications, a vehicle operator (e.g., driver) may be present in the vehicle, such as to take over manual control of the vehicle when the autonomous vehicle is operated in a testing environment. For example, during an autonomous operation testing session, periodic faults can be injected into an autonomous vehicle's autonomy system to test how the autonomous vehicle responds to certain scenarios. During such faults, the vehicle operator can provide backup control of the autonomous vehicle, such as by assuming manual control of the vehicle. However, during the course of such driving sessions, vehicle operators may become fatigued due to the infrequency of faults.

The systems and methods of the present disclosure can help determine a vehicle operator vigilance level and manage the vehicle operator vigilance level by engaging the vehicle operator with vigilance prompts. For example, a computing system can determine a vigilance prompt to be provided to a vehicle operator from a plurality of different vigilance prompts. Each vigilance prompt in the plurality can be, for example, a prompt for the vehicle operator to perform a particular interaction with the autonomous vehicle. The vigilance prompts can be specific tasks selected to improve vehicle operator responsiveness through alertness, interest, and motivation. For example, in some implementations, a vigilance prompt can be a visual cue displayed on a display screen of the autonomous vehicle or an audio queue played by a speaker of the autonomous vehicle. For example, a text command can be displayed on the display screen indicating a particular interaction, such as to press a button, touch the display screen, press a particular shifter paddle (e.g., left or right), actuate a turn indicator, actuate the windshield wipers, provide a verbal response, or other particular interaction. The computing system can then provide the vigilance prompt to the vehicle operator and receive a response from the vehicle operator when the vehicle operator performs the particular task in response to the vigilance prompt. For example, in response to receiving the prompt, the vehicle operator can perform the particular interaction, such as pressing the particular shifter paddle, etc., which can be received by the computing system as a response. The computing system can then determine a vehicle operator vigilance level based at least in part on the response. For example, the vehicle operator vigilance level can be determined based on an accuracy of the response (e.g., whether the vehicle operator performed the correct task) and/or a response time (e.g., how long it took the vehicle operator to provide the response). The computing system can then determine a vehicle operator management action based on the vigilance level, and implement the management action. For example, if the vehicle operator vigilance level is low, subsequent vigilance prompts can be provided at more frequent intervals in order to help maintain a vehicle operator's alertness.

More particularly, an autonomous vehicle (e.g., ground-based vehicle, etc.) can include various systems and devices configured to control the operation of the vehicle. For example, an autonomous vehicle can include an onboard vehicle computing system (e.g., located on or within the autonomous vehicle) that is configured to operate the autonomous vehicle. The vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. For example, the sensor data can be used in a processing pipeline that includes the detection of objects proximate to the autonomous vehicle, object motion prediction, and vehicle motion planning. For example, a motion plan can be determined by the vehicle computing system, and the vehicle can be controlled by a vehicle controller to initiate travel in accordance with the motion plan. The autonomous vehicle can also include one or more display screens, such as touch-sensitive interactive display screens, speakers, or other devices configured to provide a vehicle operator with vigilance prompts. Further, the autonomous vehicle can include various vehicle input devices, such as buttons, paddle shifters, microphones, turn indicators, windshield wipers, motion detectors (e.g., for gesture tracking), etc. The vehicle operator can perform various interactions with the autonomous vehicle through the various vehicle input devices.

In some implementations, the computing system can determine that the vehicle operator is ready to be provided a vigilance prompt. For example, the computing system can access a motion plan to determine that the autonomous vehicle is operating within an authorized area, and that the autonomous vehicle does not have any pending turns or lane changes within a testing period. For example, the testing period can be a particular time period (e.g., five seconds, ten seconds, etc.), and the motion plan can indicate that the vehicle is to travel on a straightaway path during the testing period. In some implementations, the computing system can determine that the vehicle operator is ready to be provided a vigilance prompt when the vehicle operator has not been provided a previous vigilance prompt within a threshold time period. For example, the vehicle operator can be provided with a vigilance prompt if sufficient time has elapsed since the vehicle operator was last provided a vigilance prompt (e.g., ten minutes).

The computing system can then determine a vigilance prompt to provide to the vehicle operator from a plurality of different vigilance prompts. The vigilance prompt can be a prompt to perform a particular interaction with the autonomous vehicle. The vigilance prompts in the plurality can be uncomplicated tasks which are sufficient to engage a vehicle operator without compromising the vehicle operator's ability to assume manual control of the autonomous vehicle. For example, the vehicle operator can be provided periodic vigilance prompts at regular or random intervals in order to increase vehicle operator alertness. Additionally, the plurality of vigilance prompts can include a variety of different vigilance prompts, which can further help to stimulate the vehicle operator. For example, if only a single type of vigilance prompt is used, the vehicle operator may become conditioned to perform the associated single specific task without improving the vehicle operator's alertness. The variety of vigilance prompts according to example aspects of the present disclosure, however, can prevent and overcome such conditioning of vehicle operators. For example, in some implementations, the computing system can access a list of possible vigilance prompts and randomly select a vigilance prompt. In some implementations, the computing system can select a vigilance prompt from the plurality that is different from a most recently provided vigilance prompt. In some implementations, the computing system can use complex patterns, probabilities, or other suitable methods to select the vigilance prompt.

The computing system can then provide the vigilance prompt to the vehicle operator. For example, in some implementations, an autonomous vehicle can include a display screen, such as a touch-sensitive display screen. The computing system can provide a vigilance prompt by displaying a visual cue on the display screen. In various implementations, the visual cue can implicitly or explicitly prompt the vehicle operator to perform a particular interaction. For example, in some implementations, the visual cue can be a change from a first color to a second color (e.g., red to green). The vehicle operator can be informed and/or trained to perform a particular interaction with the autonomous vehicle upon the color change. For example, the vehicle operator can press a button or touch the display screen in response to seeing the color change.

In some implementations, the visual cue can be a displayed icon (e.g., an icon showing a left shifter paddle push). In some implementations, the displayed icon can include an animation of the particular interaction the vehicle operator is to perform. In some implementations, the visual cue can be a text command (e.g., "left turn indicator"). In response, the vehicle operator can perform the particular interaction associated with the vigilance prompt with the autonomous vehicle. Other suitable visual cues can similarly be provided.

In some implementations, the vigilance prompt can be an audio cue played by a speaker of the autonomous vehicle. For example, the computing system can play a verbal command over one or more speakers of the autonomous vehicle. The verbal command can describe the particular interaction the vehicle operator is to perform (e.g., "activate windshield wipers"). In response, the vehicle operator can perform the particular interaction. Other suitable audio cues can similarly be provided.

In some implementations, each vigilance prompt can have an associated particular interaction with a component on or near the steering wheel of the autonomous vehicle (e.g., turn indicator, shifter paddle, windshield wiper actuator, etc.), which can allow for the vehicle operator's hands to be maintained in close proximity to the steering wheel while responding to the vigilance prompt. The operator's hands can activate the component in a manner that is typical with that component and, thus, not distracting from the operator's typical vehicle operation. In such an implementation, the vehicle operator's ability to assume manual control of the autonomous vehicle can be increased due to the vehicle operator's hands being in close proximity to the steering wheel.

In some implementations, the autonomous vehicle can include one or more microphones configured to receive verbal responses from the vehicle operator. For example, a display screen can display text for the vehicle operator to read out loud, such as letter or number. In some implementations, a vigilance prompt can be a simple question to which the vehicle operator is to provide a verbal answer. In response to such vigilance prompts, the vehicle operator can audibly read the text or respond to the question, which can be received by the microphone and provided to the computing system. For example, a computing system can be configured to recognize speech, which can then be used to determine an accuracy of the response.

The computing system can then determine a vigilance level based at least in part on the vehicle operator's response. In some implementations, the vigilance level can be determined based on an accuracy of the vehicle operator's response, such as whether the vehicle operator performed the particular interaction in the vigilance prompt correctly (e.g., pushed the correct shifter paddle). In some implementations, the vigilance level can be determined based on a response time, such as the time it took for the vehicle operator to perform the particular interaction following the vigilance prompt. For example, the computing system can reference lookup tables for particular vigilance prompts, such as acceptable response times and/or acceptable accuracy rates for the particular vigilance prompts. In some implementations, the vigilance level can be expressed as a numerical value (e.g., on a scale), a percentage, or other suitable format. In some implementations, the vigilance level can be expressed as category (e.g. pass/fail, high/medium/low, responsive/nonresponsive, etc.). In some implementations, the vigilance level can be determined based on a plurality of vehicle operator responses, such as a plurality of the most recently received responses (e.g., a mean, median, rolling window, etc.). In this way, the vigilance level determined by the computing system can be indicative of the overall alertness and vigilance of the vehicle operator, both historically as well as at a particular time. In some implementations, each vehicle operator can have an associated profile, and respective vehicle operator vigilance levels can be tracked over time, such as over a plurality of autonomous driving sessions.

In some implementations, the computing system can determine a vehicle operator management action based at least in part on the vigilance level. For example, in some implementations, the vehicle operator management action can be to provide one or more subsequent vigilance prompts to the vehicle operator. For example, if a vehicle operator vigilance level is low, the computing system can determine a time delay based at least in part on the vehicle operator vigilance level. For example, for a low vigilance level, the time delay for a second vigilance prompt can be a short time delay, such as a five minute delay as compared to a 10 minute delay for a middle vigilance level or a 15 minute delay for a high vigilance level. Stated differently, the computing system can use the vehicle operator vigilance level to determine (e.g., adjust) the frequency of one or more subsequent vigilance prompts. By providing subsequent vigilance prompts at a higher frequency, the vehicle operator's vigilance can be increased by stimulating the vehicle operator more frequently. Similarly, for vehicle operators with a high vigilance level, the frequency of subsequent vigilance prompts can, in some instances, be reduced, as the vehicle operator or may not require additional stimulation to maintain his/her vigilance.

In some implementations, the vehicle operator management action can be to determine (e.g., adjust) the type of one or more subsequent vigilance prompts. For example, certain vigilance prompts and their associated particular interactions may be better at stimulating and engaging the vehicle operator, and therefore more effective in maintaining the vehicle operator's vigilance. For example, in some implementations, analysis of a particular vehicle operator's profile may indicate that touching a display screen in response to a color change is more effective at increasing the vehicle operator vigilance level than pressing a button in response to an icon display. Accordingly, if the vehicle operator vigilance level is low, the computing system can increase the frequency of the display screen touch vigilance prompt relative to the button press vigilance prompt. Similarly, for some vehicle operators, audio cues may be more effective in maintaining a vehicle operator vigilance level than visual cues, or vice-versa. Accordingly, if a vehicle operator vigilance level is low, the computing system can provide audio cues rather than visual cues, or vice-versa. In this way, a computing system can determine a vigilance prompt based at least in part on a vehicle operator vigilance level.

Similarly, in some implementations, the type of vigilance prompt can include both a visual cue and an audio cue. For example, if a vehicle operator vigilance level is low, such as following several consecutive vigilance prompts, the computing system can escalate the type of vigilance prompt by concurrently providing both an audio cue and a visual cue with each vigilance prompt. By providing both a visual cue and an audio cue, the vehicle operator may be stimulated, and therefore have improved vigilance.

In some implementations, the vehicle operator can be provided feedback on the vehicle operator vigilance level. For example, the computing system can display or audibly play an indicator of the vehicle operator vigilance level (e.g., a numerical value, score, percentage, accuracy, response time, or category, such as pass/fail, high/low, etc.). In some implementations, a vehicle operator vigilance level for a particular vigilance prompt can be provided, such as an indication of the accuracy or response time following a response to a particular vigilance prompt. In some implementations, the vehicle operator vigilance level can track a vehicle operator's vigilance over a plurality of vigilance prompts, which can indicate whether a vehicle operator's vigilance is improving or decreasing. By providing the vehicle operator with feedback on the vehicle operator vigilance level, the vehicle operator's interest and motivation to perform well may cause the vehicle operator to become more vigilant.

In some implementations, the vehicle operator management action can include operating the autonomous vehicle to a safe state in which autonomous operation is disabled. For example, if a vehicle operator's vigilance level is too low, such as following a failure to respond to one or more consecutive vigilance prompts, the computing system can implement a motion plan to operate the vehicle to a safe state, such as navigating the autonomous vehicle to a stop in a parking lot, and autonomous operation can be disabled. For example, the vehicle operator can be prevented from causing the autonomous vehicle to enter an autonomous operation mode until a reset has occurred, such as after the vehicle operator has been contacted by an external vehicle operator management system. Further, the vehicle operator may only be able to operate the autonomous vehicle in a manual operating mode until the reset has occurred.

Similarly, in some implementations, the autonomous vehicle may be configured to operate autonomously for one or more discrete portions of a motion plan, and at the end of each portion, the vehicle operator may be required to engage or reengage autonomous operation before the autonomous vehicle proceeds to initiate travel in accordance with the motion plan. If the vehicle operator vigilance level is too low, in some implementations, the vehicle operator may be prevented from causing the autonomous vehicle to enter an autonomous operating mode.

In some implementations, a vehicle operator management action can include contacting an external vehicle operator management system. For example, an autonomous vehicle can include a communication system configured to communicate with an external vehicle operator management system. The external vehicle operator management system can be remote from the vehicle, and can provide various services such as security services, emergency services, roadside assistance, remote diagnostics, and/or communication services, such as with an emergency operator. In some implementations, the external vehicle operator management system can assist the vehicle operator and/or remotely diagnose one or more issues with the autonomous vehicle. For example, if a vehicle operator vigilance level is low, a remote operator can ask the vehicle operator if there is anything in particular affecting the vehicle operator's ability to respond to vigilance prompts. For example, external weather conditions or traffic conditions may impair a vehicle operator's ability to respond to vigilance prompts due to the vehicle operator paying close attention to the conditions in which the autonomous vehicle is operating. Similarly, a vehicle operator input device, such as a microphone, may be malfunctioning, and the external vehicle operator management system may be able to remotely diagnose such malfunctions. In such situations, the external vehicle operator management system can determine that the vehicle operator's vigilance level should not prevent the vehicle operator from causing the vehicle to enter or continue operating in an autonomous operating mode. Similarly, the external vehicle operator management system can reset or clear any disablement of autonomous operation, such as when the autonomous vehicle has been operated to a safe state or the vehicle operator has been prevented from causing the vehicle to enter an autonomous operating mode.

In some implementations, the vehicle operator management action can include logging the vehicle operator vigilance level, such as for later analysis. For example, the computing system can locally store data indicative of the vehicle operator vigilance level, such as individual responses, response accuracy levels, response times, or other data related to or indicative of the vehicle operator vigilance level. The computing system can further be configured to communicate the logged data, such as over a communications network, to an external computing system. In some implementations, analysis can be performed on the log data in order to identify ways to maintain and/or improve a vehicle operate or vigilance level. For example, machine learned models can be used to identify effective vigilance prompts, both on an individual level (e.g., a particular vehicle operator profile) or over a plurality of vehicle operators (e.g., aggregated vehicle operator profiles).

According to another example aspect of the present disclosure, in some implementations, an autonomous vehicle can be configured to operate in a non-public testing environment, such as on an isolated testing track. For example, in order to test how an autonomous vehicle responds to particular operating conditions, periodic faults can be injected into a vehicle's autonomy system, and the vehicle's response can be logged for analysis. For example, a plurality of faults can be queued up to be injected at regular or random intervals over the course of an autonomous vehicle testing session (e.g., every 10-20 minutes). In such an environment, a vehicle operator may be present to assume manual control of the autonomous vehicle when such a fault occurs. However, individual vehicle operators may have different response capabilities. For example, some vehicle operators may maintain a hyper-vigilant state for an extended period of time following a fault, whereas other vehicle operators may return to a normal resting state in the same period of time. Vehicle operators in a hyper-vigilant state may respond much more quickly than vehicle operators in a normal resting state. Thus, individual vehicle operator performance can impact testing results where outcomes are heavily dependent on the quality of vehicle operator reactions.

To address this, in some implementations, the computing system can be configured to determine a cognitive loading component based on a vehicle operator vigilance level. The cognitive loading component can be, for example, a cognitive load aspect of a vigilance prompt which requires the vehicle operator to perform a more or less complicated task. For example, rather than pushing a button, the vehicle operator may be required to press a sequence of buttons, solve a mathematical question and provide a verbal response, or perform some other cognitive task. Similarly, in some implementations, the variety of vigilance prompts and the amount of time between the vigilance prompts can be increased or reduced. The cognitive loading component can be used to normalize vehicle operator response times. For example, reduced cognitive loading components can improve vehicle operator response times, while increased cognitive loading components can slow vehicle operator response times. In this way, individual vehicle operator performance can be normalized, which can help prevent testing results from being skewed by hyper-vigilant vehicle operators.

The systems and methods described herein provide a number of technical effects and benefits. More particularly, the systems and methods of the present disclosure provide improved techniques for determining and managing vehicle operator vigilance in autonomous vehicles. To do so, aspects of the present disclosure allow a computing system to determine and provide a vehicle operator with a variety of vigilance prompts configured to stimulate and engage the vehicle operator. Further, the computing system can determine a vigilance level of a vehicle operator, and implement a variety of management actions to improve vehicle operator vigilance. In this way, individual vehicle operator responsiveness can be improved through alertness, interest, and motivation. In turn, vehicle operators can respond to autonomous vehicle faults or other scenarios more quickly, thereby enhancing public safety.

Example aspects of the present disclosure can provide an improvement to vehicle computing technology, such as autonomous vehicle computing technology. For instance, the systems and methods of the present disclosure provide an improved approach to managing vehicle operator vigilance. For example, a computing system (e.g., an onboard computing system of an autonomous vehicle) can determine a vehicle operator is ready to receive a vigilance prompt. For example, the computing system can determine that the autonomous vehicle is operating within an authorized area without any pending turns or lane changes within a testing period, and that the vehicle operator has not been provided a previous vigilance prompt within a threshold time period. The computing system can then determine a particular vigilance prompt to be provided from a plurality of different vigilance prompts. Each vigilance prompt can be a prompt for the vehicle operator to perform a particular interaction with the autonomous vehicle, and can be provided by visual or audio cues. The computing system can provide the vigilance prompt, and receive a response to the vigilance prompt from the vehicle operator. The computing system can determine a vigilance level based at least in part on the vehicle operator response. For example, the vehicle operator vigilance level can be determined based at least in part on an accuracy and/or a response time of the response. The computing system can then determine the vehicle operator management action based at least in part on the vehicle operator vigilance level. For example, the computing system can adjust a frequency of one or more subsequent vigilance prompts, adjust a type of one or more subsequent vigilance prompts, provide the vehicle operator with vigilance level feedback, operate the autonomous vehicle to a safe state in which autonomous operation is disabled, prevent the vehicle operator from causing the autonomous vehicle to enter an autonomous operating mode, contact an external vehicle operator management system, or log the vehicle operator vigilance level. This can efficiently determine and improve real-time vehicle operator vigilance using existing infrastructure of an autonomous vehicle.

With reference now to the FIGS., example aspects of the present disclosure will be discussed in further detail. FIG. 1 illustrates an example vehicle computing system 100 according to example embodiments of the present disclosure. The vehicle computing system 100 can be associated with an autonomous vehicle 105. The vehicle computing system 100 can be located onboard (e.g., included on and/or within) the autonomous vehicle 105.

The autonomous vehicle 105 incorporating the vehicle computing system 100 can be various types of vehicles. For instance, the autonomous vehicle 105 can be a ground-based autonomous vehicle such as an autonomous car, autonomous truck, autonomous bus, etc. The autonomous vehicle 105 can be an air-based autonomous vehicle (e.g., airplane, helicopter, or other aircraft) or other types of vehicles (e.g., watercraft, etc.). The autonomous vehicle 105 can drive, navigate, operate, etc. with minimal and/or no interaction from a human operator (e.g., driver). In some implementations, a human operator can be omitted from the autonomous vehicle 105 (and/or also omitted from remote control of the autonomous vehicle 105). In some implementations, a human operator (also referred to as a vehicle operator) can be included in the autonomous vehicle 105.

In some implementations, the autonomous vehicle 105 can be configured to operate in a plurality of operating modes. The autonomous vehicle 105 can be configured to operate in a fully autonomous (e.g., self-driving) operating mode in which the autonomous vehicle 105 is controllable without user input (e.g., can drive and navigate with no input from a vehicle operator present in the autonomous vehicle 105 and/or remote from the autonomous vehicle 105). The autonomous vehicle 105 can operate in a semi-autonomous operating mode in which the autonomous vehicle 105 can operate with some input from a vehicle operator present in the autonomous vehicle 105 (and/or a human operator that is remote from the autonomous vehicle 105). The autonomous vehicle 105 can enter into a manual operating mode in which the autonomous vehicle 105 is fully controllable by a vehicle operator (e.g., human driver, pilot, etc.) and can be prohibited and/or disabled (e.g., temporary, permanently, etc.) from performing autonomous navigation (e.g., autonomous driving). In some implementations, the autonomous vehicle 105 can implement vehicle operating assistance technology (e.g., collision mitigation system, power assist steering, etc.) while in the manual operating mode to help assist the vehicle operator of the autonomous vehicle 105.

The operating modes of the autonomous vehicle 105 can be stored in a memory onboard the autonomous vehicle 105. For example, the operating modes can be defined by an operating mode data structure (e.g., rule, list, table, etc.) that indicates one or more operating parameters for the autonomous vehicle 105, while in the particular operating mode. For example, an operating mode data structure can indicate that the autonomous vehicle 105 is to autonomously plan its motion when in the fully autonomous operating mode. The vehicle computing system 100 can access the memory when implementing an operating mode.

The operating mode of the autonomous vehicle 105 can be adjusted in a variety of manners. For example, the operating mode of the autonomous vehicle 105 can be selected remotely, off-board the autonomous vehicle 105. For example, a remote computing system (e.g., of a vehicle provider and/or service entity associated with the autonomous vehicle 105) can communicate data to the autonomous vehicle 105 instructing the autonomous vehicle 105 to enter into, exit from, maintain, etc. an operating mode. In some implementations, the remote computing system can be an emergency vehicle operator management system, as disclosed herein. By way of example, such data communicated to an autonomous vehicle 105 by a remote computing system can instruct the autonomous vehicle 105 to enter into the fully autonomous operating mode. In some implementations, the operating mode of the autonomous vehicle 105 can be set onboard and/or near the autonomous vehicle 105. For example, the vehicle computing system 100 can automatically determine when and where the autonomous vehicle 105 is to enter, change, maintain, etc. a particular operating mode (e.g., without user input). Additionally, or alternatively, the operating mode of the autonomous vehicle 105 can be manually selected via one or more interfaces located onboard the autonomous vehicle 105 (e.g., key switch, button, etc.) and/or associated with a computing device proximate to the autonomous vehicle 105 (e.g., a tablet operated by authorized personnel located near the autonomous vehicle 105). In some implementations, the operating mode of the autonomous vehicle 105 can be adjusted by manipulating a series of interfaces in a particular order to cause the autonomous vehicle 105 to enter into a particular operating mode.

The vehicle computing system 100 can include one or more computing devices located onboard the autonomous vehicle 105. For example, the computing device(s) can be located on and/or within the autonomous vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the autonomous vehicle 105 (e.g., its computing system, one or more processors, etc.) to perform operations and functions, such as those described herein for managing a vehicle operator's vigilance.

The autonomous vehicle 105 can include a communications system 120 configured to allow the vehicle computing system 100 (and its computing device(s)) to communicate with other computing devices. The vehicle computing system 100 can use the communications system 120 to communicate with one or more computing device(s) that are remote from the autonomous vehicle 105 over one or more networks (e.g., via one or more wireless signal connections). In some implementations, the communications system 120 can allow communication among one or more of the system(s) on-board the autonomous vehicle 105. The communications system 120 can include any suitable components for interfacing with one or more network(s), including, for example, transmitters, receivers, ports, controllers, antennas, and/or other suitable components that can help facilitate communication.

As shown in FIG. 1, the autonomous vehicle 105 can include one or more vehicle sensors 125, an autonomy computing system 130, one or more vehicle control systems 135, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 125 can be configured to acquire sensor data 140. This can include sensor data associated with the surrounding environment of the autonomous vehicle 105. For instance, the sensor data 140 can acquire image and/or other data within a field of view of one or more of the vehicle sensor(s) 125. The vehicle sensor(s) 125 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 140 can include image data, radar data, LIDAR data, and/or other data acquired by the vehicle sensor(s) 125. The autonomous vehicle 105 can also include other sensors configured to acquire data associated with the autonomous vehicle 105. For example, the autonomous vehicle 105 can include inertial measurement unit(s), wheel odometry devices, and/or other sensors.

In some implementations, the sensor data 140 can be indicative of one or more objects within the surrounding environment of the autonomous vehicle 105. The object(s) can include, for example, vehicles, pedestrians, bicycles, and/or other objects. The object(s) can be located in front of, to the rear of, to the side of the autonomous vehicle 105, etc. The sensor data 140 can be indicative of locations associated with the object(s) within the surrounding environment of the autonomous vehicle 105 at one or more times. The vehicle sensor(s) 125 can provide the sensor data 140 to the autonomy computing system 130.

In addition to the sensor data 140, the autonomy computing system 130 can retrieve or otherwise obtain map data 145. The map data 145 can provide information about the surrounding environment of the autonomous vehicle 105. In some implementations, an autonomous vehicle 105 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the autonomous vehicle 105 in comprehending and perceiving its surrounding environment and its relationship thereto. In some implementations, the vehicle computing system 100 can determine a vehicle route for the autonomous vehicle 105 based at least in part on the map data 145.

The autonomous vehicle 105 can include a positioning system 150. The positioning system 150 can determine a current position of the autonomous vehicle 105. The positioning system 150 can be any device or circuitry for analyzing the position of the autonomous vehicle 105. For example, the positioning system 150 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the autonomous vehicle 105 can be used by various systems of the vehicle computing system 100 and/or provided to a remote computing system. For example, the map data 145 can provide the autonomous vehicle 105 relative positions of the elements of a surrounding environment of the autonomous vehicle 105. The autonomous vehicle 105 can identify its position within the surrounding environment (e.g., across six axes, etc.) based at least in part on the map data. For example, the vehicle computing system 100 can process the sensor data 140 (e.g., LIDAR data, camera data, etc.) to match it to a map of the surrounding environment to get an understanding of the vehicle's position within that environment.

The autonomy computing system 130 can include a perception system 155, a prediction system 160, a motion planning system 165, and/or other systems that cooperate to perceive the surrounding environment of the autonomous vehicle 105 and determine a motion plan for controlling the motion of the autonomous vehicle 105 accordingly. For example, the autonomy computing system 130 can obtain the sensor data 140 from the vehicle sensor(s) 125, process the sensor data 140 (and/or other data) to perceive its surrounding environment, predict the motion of objects within the surrounding environment, and generate an appropriate motion plan through such surrounding environment. The autonomy computing system 130 can communicate with the one or more vehicle control systems 135 to operate the autonomous vehicle 105 according to the motion plan.

The vehicle computing system 100 (e.g., the autonomy computing system 130) can identify one or more objects that are proximate to the autonomous vehicle 105 based at least in part on the sensor data 140 and/or the map data 145. For example, the vehicle computing system 100 (e.g., the perception system 155) can process the sensor data 140, the map data 145, etc. to obtain perception data 170. The vehicle computing system 100 can generate perception data 170 that is indicative of one or more states (e.g., current and/or past state(s)) of a plurality of objects that are within a surrounding environment of the autonomous vehicle 105. For example, the perception data 170 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 155 can provide the perception data 170 to the prediction system 160 (and/or the motion planning system 165).

The prediction system 160 can be configured to predict a motion of the object(s) within the surrounding environment of the autonomous vehicle 105. For instance, the prediction system 160 can generate prediction data 175 associated with such object(s). The prediction data 175 can be indicative of one or more predicted future locations of each respective object. For example, the prediction system 160 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175 can be indicative of the speed and/or acceleration at which the respective object is predicted to travel along its associated predicted motion trajectory. The prediction system 160 can output the prediction data 175 (e.g., indicative of one or more of the predicted motion trajectories) to the motion planning system 165.

The vehicle computing system 100 (e.g., the motion planning system 165) can determine a motion plan 180 for the autonomous vehicle 105 based at least in part on the perception data 170, the prediction data 175, and/or other data. A motion plan 180 can include vehicle actions (e.g., planned vehicle trajectories, speed(s), acceleration(s), other actions, etc.) with respect to one or more of the objects within the surrounding environment of the autonomous vehicle 105 as well as the objects' predicted movements. For instance, the motion planning system 165 can implement an optimization algorithm, model, etc. that considers cost data associated with a vehicle action as well as other objective functions (e.g., cost functions based on speed limits, traffic lights, etc.), if any, to determine optimized variables that make up the motion plan 180. The motion planning system 165 can determine that the autonomous vehicle 105 can perform a certain action (e.g., pass an object, etc.) without increasing the potential risk to the autonomous vehicle 105 and/or violating any traffic laws (e.g., speed limits, lane boundaries, signage, etc.). For instance, the motion planning system 165 can evaluate one or more of the predicted motion trajectories of one or more objects during its cost data analysis as it determines an optimized vehicle trajectory through the surrounding environment. The motion planning system 165 can generate cost data associated with such trajectories. In some implementations, one or more of the predicted motion trajectories may not ultimately change the motion of the autonomous vehicle 105 (e.g., due to an overriding factor). In some implementations, the motion plan 180 may define the vehicle's motion such that the autonomous vehicle 105 avoids the object(s), reduces speed to give more leeway to one or more of the object(s), proceeds cautiously, performs a stopping action, etc.

The motion planning system 165 can be configured to continuously update the vehicle's motion plan 180 and a corresponding planned vehicle motion trajectory. For example, in some implementations, the motion planning system 165 can generate new motion plan(s) for the autonomous vehicle 105 (e.g., multiple times per second). Each new motion plan can describe a motion of the autonomous vehicle 105 over the next planning period (e.g., next several seconds). Moreover, a new motion plan may include a new planned vehicle motion trajectory. Thus, in some implementations, the motion planning system 165 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the autonomous vehicle 105.

The vehicle computing system 100 can cause the autonomous vehicle 105 to initiate a motion control in accordance with at least a portion of the motion plan 180. A motion control can be an operation, action, etc. that is associated with controlling the motion of the vehicle. For instance, the motion plan 180 can be provided to the vehicle control system(s) 135 of the autonomous vehicle 105. The vehicle control system(s) 135 can be associated with a vehicle controller (e.g., including a vehicle interface) that is configured to implement the motion plan 180. The vehicle controller can, for example, translate the motion plan into instructions for the appropriate vehicle control component (e.g., acceleration control, brake control, steering control, etc.). By way of example, the vehicle controller can translate a determined motion plan 180 into instructions to adjust the steering of the autonomous vehicle 105 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 180 (e.g., by sending control signal(s), making the translated plan available, etc.). This can allow the autonomous vehicle 105 to autonomously travel within the vehicle's surrounding environment.

The vehicle computing system 100 can a vigilance management system 185. The vigilance management system 185 can provide one or more vigilance prompts, as described in greater detail herein, to manage a vehicle operator's vigilance. In some implementations, the vigilance management system 185 can be configured to operate in conjunction with the vehicle autonomy system 130. For example, the vigilance management system 185 can send data to and receive data from the vehicle autonomy system 130. In some implementations, the vigilance management system 185 can be included in or otherwise a part of a vehicle autonomy system 130. The vigilance management system 185 can include software and hardware configured to provide the functionality described herein. In some implementations, the v vigilance management system 185 can be implemented as a subsystem of a vehicle computing system 100. Example vigilance management system 185 configurations according to example aspects of the present disclosure are discussed in greater detail with respect to FIGS. 3 and 4.

Figure 2:
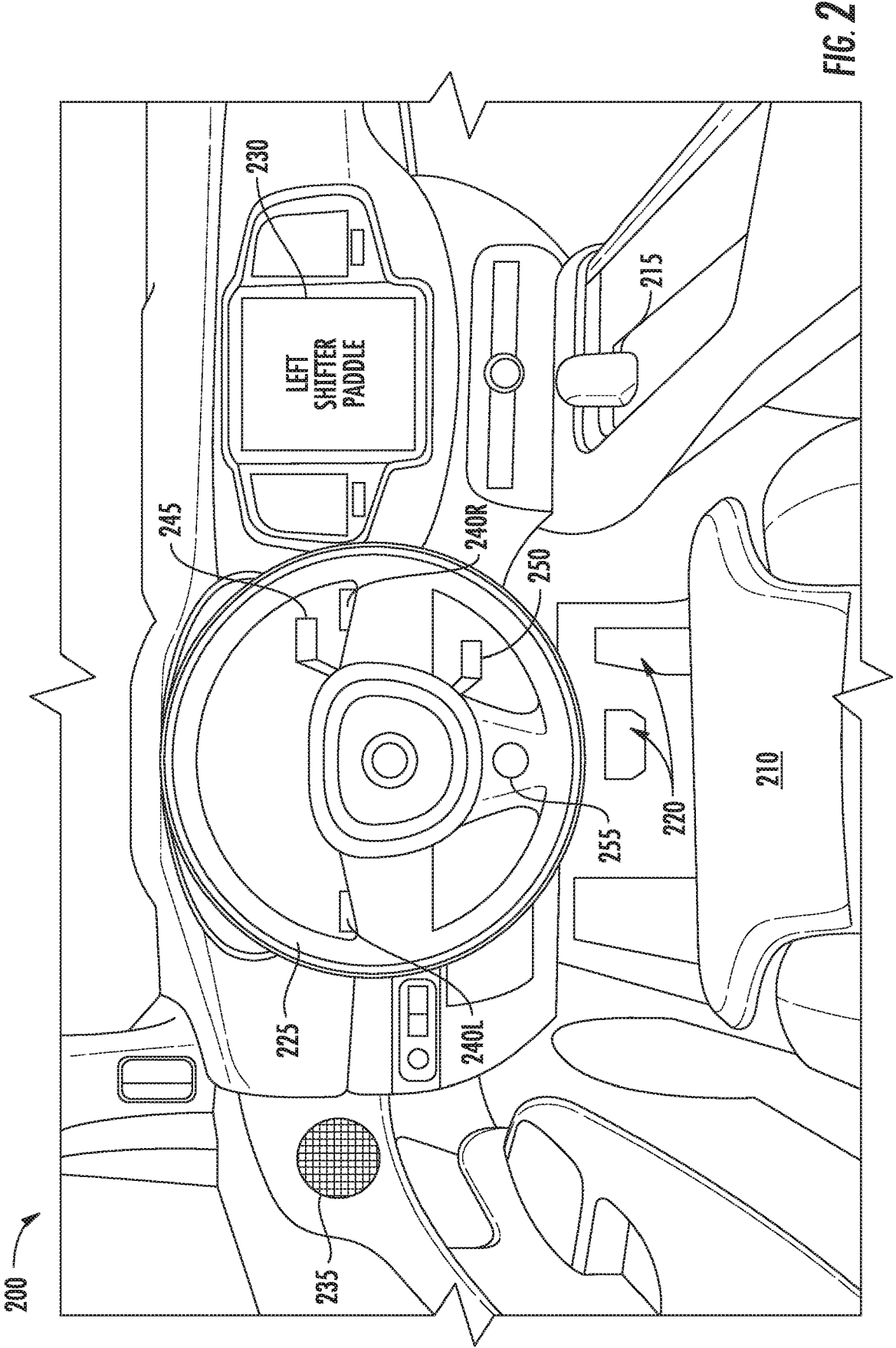
FIG. 2 depicts an example vehicle operator's perspective of an inside cab portion of an autonomous vehicle according to example aspects of the present disclosure.

FIG. 2 depicts an example vehicle operator's perspective of an inside cab portion 200 of an autonomous vehicle according to example aspects of the present disclosure. The inside cab portion 200 can be, for example, an inside cab portion of an autonomous vehicle 105, and can be used to provide vigilance prompts to a vehicle operator and receive responses from the vehicle operator in response to the vigilance prompts, as disclosed herein. The inside cab portion 200 depicted in FIG. 2 is for illustrative purposes only. Other suitable inside cab portion configurations can similarly be used to provide vigilance prompts and receive responses from the vehicle operator.

Inside cab portion 200 can include one or more seats 210 in which a vehicle operator can sit while manually operating the vehicle. For example, manual vehicle controls such as a gear shifter 215, pedals 220 and a steering wheel 225 can be accessible to a vehicle operator sitting in seat 210.

In some implementations, inside cab portion 200 can also include one or more display screens 230, such as touch-sensitive display screens. The display screens 230 can provide information to the vehicle operator, such as navigation information (e.g., GPS navigation) and/or other information. The inside cab portion can also include one or more speakers 235 configured to audibly play sounds for the vehicle operator. For example, the one or more speakers 235 can be used to play music or play communications from a remote emergency operator. In some implementations, inside cab portion 200 can also include one or more microphones (not shown). For example, the vehicle operator can have a two-way communication with a remote emergency operator by speaking into the microphone, and receiving responses from the remote emergency operator via the one or more speakers 235.

In some implementations, steering wheel 225 and/or components of an inside cab portion 200 can include various vehicle operator input devices. For example, the vehicle operator input devices can allow for a vehicle operator to perform particular interactions with the vehicle.

For example, in some implementations, one or more shifter paddles 240 can be included on or otherwise incorporated into a steering wheel 225. For example, as shown in FIG. 2, a first shifter paddle 240L is positioned on a left side of steering wheel 225, and a second shifter paddle 240R is positioned on a right side of steering wheel 225. Each shifter paddle can be configured to manually control shifting between gears. For example, a first shifter paddle 240L can be used to downshift a gear, and a second shifter paddle 240R can be used to upshift. As depicted in FIG. 2, in some implementations, shifter paddles 240L and 240R can be configured to be accessible without a vehicle operator removing his/her hands from the steering wheel 225. In some implementations, both the first and second shifter paddles 240L and 240R can be positioned on a single side of a steering wheel 225, on a front portion of a steering wheel 225, proximate to a steering wheel 225 (such as on a steering column assembly), or in any other suitable configuration.

In some implementations, a steering wheel 225 can include a windshield wiper control arm 245. Windshield wiper control on 245 can be configured to, for example, initiate control of a windshield wiper system in order to remove rain and/or debris from a windshield of the vehicle. In some implementations, windshield wiper control arm 245 can include controls configured to, for example, select a windshield wiper actuation frequency (e.g., a continuous or intermittent mode), spray the windshield with windshield wiper fluid, cause the windshield wipers to wipe the windshield (e.g., 1-3 quick wipes in succession), or other windshield wiper control actions.

In some implementations, steering wheel 225 can also include a turn indicator 250. For example, turn indicator 250 can be used to activate a left turn signal, a right turn signal, and in some implementations, a hazard signal wherein both the left and right turn signals are activated.

In some implementations, steering wheel 225 can include a purpose-built button 255 for example, purpose-built button 255 can be an aftermarket button incorporated into a steering wheel 225. Purpose-built button 255 can be used, for example, to receive a vehicle operator response in response to a vigilance prompt for the vehicle operator to push the purpose-built button 255, as disclosed herein.

While several vehicle operator input devices 240, 245, 250, and 255 are depicted in FIG. 2 as being included on or otherwise incorporated into a steering wheel 225, it should be noted that some or all of these vehicle operator input devices may be located at other locations within an inside cab portion 200 of an autonomous vehicle. Further, other vehicle operator input devices can similarly be included in an inside cab portion 200, such as included on or otherwise incorporated into the steering wheel 225 or at other locations.

According to example aspects of the present disclosure, the one or more display screens 230 and/or the one or more speakers 235 can be used to provide vigilance prompts to a vehicle operator. For example, a vigilance prompt can be a prompt for a vehicle operator to perform a particular interaction with the autonomous vehicle. For example, a vigilance prompt can be an uncomplicated tasks which is sufficient to engage a vehicle operator without compromising the vehicle operator's ability to assume manual control of the autonomous vehicle.

As examples, in some implementations, the vigilance prompts can be visual cues displayed on a display screen of the autonomous vehicle. For example, a visual cue can be a color change (e.g., from a first color to a second color), an icon display depicting a particular interaction (e.g., a static icon or an animation), a text command, or other visual cue. For example, a vehicle operator can be informed that he or she is to touch the display screen 230 when the display screen changes color. Similarly, when a text command is displayed on the display screen 230, the vehicle operator can be prompted to perform the particular interaction displayed. For example, as shown in FIG. 2, the text "LEFT SHIFTER PADDLE" is displayed on the display screen 230, which can be a vigilance prompt for the vehicle operator to press the left shifter paddle 240L. Various icons, animations, and other visual cues can be likewise used as vigilance prompts to prompt the vehicle operator to perform a particular interaction with the autonomous vehicle.

Similarly, in some implementations, one or more vigilance prompts can be provided audio cues by the one or more speakers 235. For example, the speakers 235 can be used to provide a command for the vehicle operator to perform a particular interaction with the vehicle that the vehicle operator hears over the one or more speakers 235. For example, the vehicle operator can be provided an audio cue, via the one or more speakers 235 to, for example, "ACTIVATE LEFT TURN SIGNAL" or perform some other particular interaction.

In some implementations, the vigilance prompt can include both a visual cue and an audio cue. For example, a text command such as "LEFT SHIFTER PADDLE" can be displayed on a display screen 230 concurrently with an audio cue with the same command.

In response, to receiving a vigilance prompt, the vehicle operator can provide a response. For example, in response to "LEFT SHIFTER PADDLE" being displayed on the display screen 230, the vehicle operator can press the left shifter paddle 240L. Similarly, in response to an audio cue to "ACTIVATE LEFT TURN SIGNAL" the vehicle operator can activate the turn indicator 250 to turn on the left turn signal.

In some implementations, the vehicle operator can provide a verbal response to a vigilance prompt. For example, the vehicle operator could be asked a question, such as by text displayed on a display screen 230 or as sound played through the one or more speakers 235. In response, the vehicle operator can provide a verbal response, such as via one or more microphones (not shown) configured to receive audio signals within an inside cab portion 200 of an autonomous vehicle.

According to example aspects of the present disclosure, a vehicle operator can be provided a variety of vigilance prompts, such as at regular or random intervals, in order to engage and stimulate the vehicle operator in order to improve the vehicle operator's alertness. Further, the variety of vigilance prompts provided herein can help to prevent and overcome any tendency of a vehicle operator to becoming conditioned to respond to a vigilance prompt without improving the vehicle operator's alertness, such as can happen when only a single type of prompt is provided.

Figure 3:
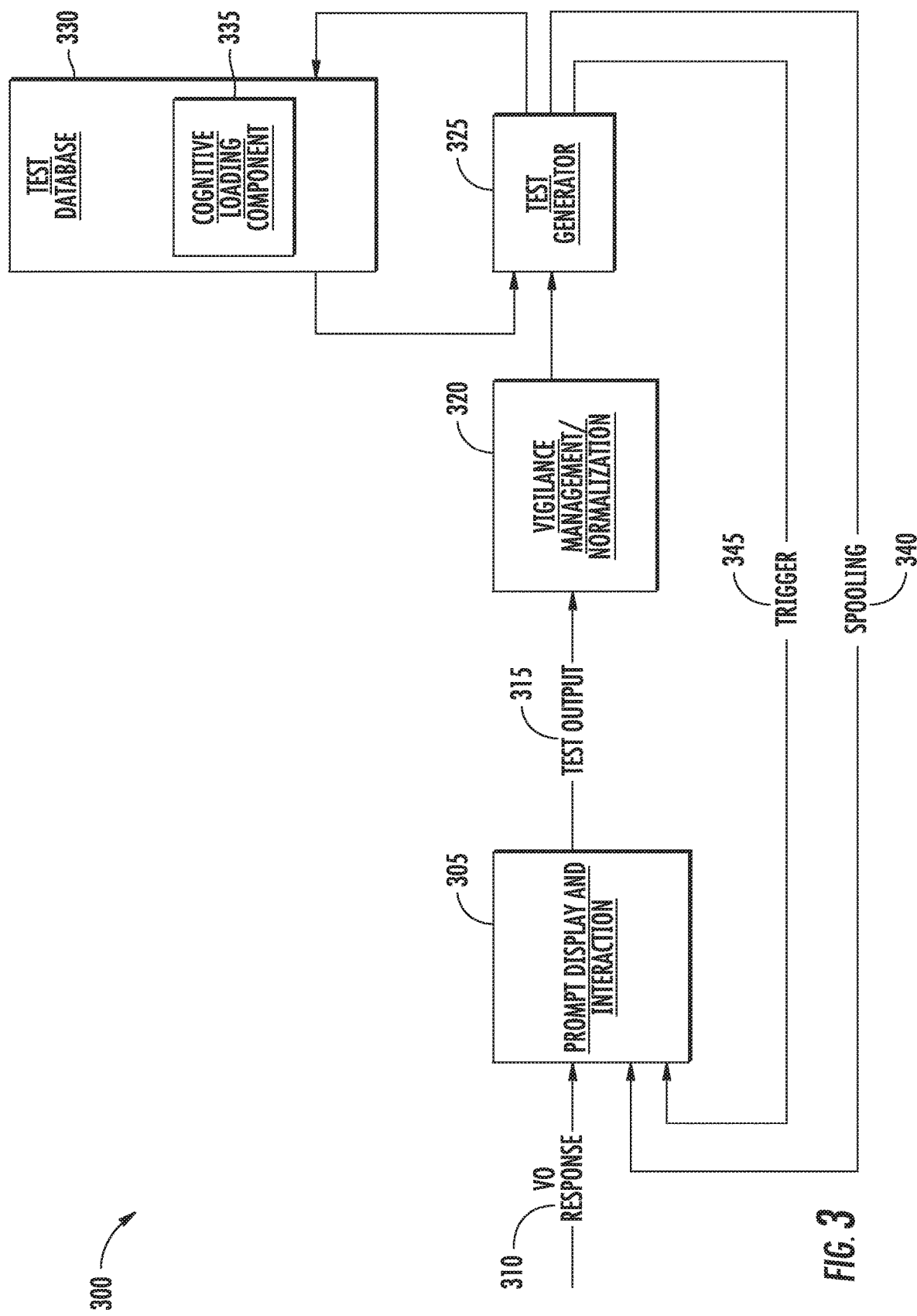
FIG. 3 depicts an example vigilance management system configuration according to example aspects of the present disclosure.

Referring now to FIG. 3, an example vigilance management system 300 according to example aspects of the present disclosure is depicted. The vigilance management system 300 can be implemented by one or more processors and one or more memory devices, such as, for example, a vehicle computing system 100. The vigilance management system 300 can be used to manage a vehicle operator's vigilance level by periodically testing the vehicle operator via one or more vigilance prompts.

As shown, a vigilance prompt and interaction 305 can be provided to a vehicle operator of an autonomous vehicle. The vigilance prompt can be, for example, a visual cue displayed on a display screen of the autonomous vehicle or an audio cue provided by a speaker of the autonomous vehicle, as disclosed herein. In response, the vehicle operator can provide a response 310. For example, the vigilance prompt can prompt the vehicle operator to perform a particular user interaction with the autonomous vehicle, and in response, the vehicle operator can perform the particular interaction, as disclosed herein.

A test output 315 can then be provided to a vigilance management/normalization 320 based at least in part on the vehicle operator's response 310 to the vigilance prompt and interaction 305. For example, the test output 315 can describe how quickly the vehicle operator responded (e.g., a response time), an accuracy of the response 310 (e.g., whether the vehicle operator performed the correct interaction), and/or other information, such as information about the particular vigilance prompt and interaction 305 provided to the vehicle operator.

The vigilance management/normalization 320 can then determine a vehicle operator management action based at least in part on the test output 315. For example, the vigilance management/normalization 320 can determine a vigilance level based at least in part on the test output 315. In some implementations, the vigilance level can be determined based on an accuracy of the test output 315, such as whether the vehicle operator performed the particular interaction in the vigilance prompt and interaction 310 correctly (e.g., pushed the correct shifter paddle, etc.). In some implementations, the vigilance level can be determined based on a response time of the test output 315, such as the time it took for the vehicle operator to provide the response 310 following the vigilance prompt and interaction 305. For example, the vigilance management/normalization 320 can reference lookup tables for particular vigilance prompts, such as acceptable response times and/or acceptable accuracy rates for the particular vigilance prompts. In some implementations, the vigilance level can be expressed as a numerical value (e.g., on a scale), a percentage, or other suitable format. In some implementations, the vigilance level can be expressed as category (e.g. pass/fail, high/medium/low, responsive/nonresponsive, etc.). In some implementations, the vigilance level can be determined based on a plurality of vehicle operator responses 310, such as a plurality of the most recently received responses 310 (e.g., a mean, median, rolling window, etc.). In this way, the vigilance level determined by vigilance management/normalization 320 can be indicative of the overall alertness and vigilance of the vehicle operator, both historically as well as at a particular time. In some implementations, each vehicle operator can have an associated profile, and respective vehicle operator vigilance levels can be tracked over time, such as over a plurality of autonomous driving sessions.

In some implementations, the vigilance management/normalization 320 can determine a vehicle operator management action based at least in part on test output 315 and/or the vigilance level. For example, in some implementations, the vehicle operator management action can be to provide one or more subsequent vigilance prompts to the vehicle operator.

For example, the vigilance management/normalization 320 can use a test generator 325 to generate the one or more subsequent vigilance prompts. For example, the test generator 325 can access a test database 330, which can include a variety of vigilance prompts. The test generator 325 can determine how often the one or more subsequent vigilance prompts can be provided, as well as a type of vigilance prompt to provide. For example, the test generator can determine the one or more subsequent vigilance prompts and one or more intervals at which they are provided based at least in part on the test output 315, the vigilance level, a random selection, a pattern, a vehicle operator profile, and/or other factors. For example, if a vehicle operator vigilance level is low, the test generator 325 can determine a time delay based at least in part on the test output 315 and/or the vehicle operator vigilance level. For example, for a low vigilance level, the time delay for a subsequent vigilance prompt can be a short time delay, such as a five minute delay as compared to a 10 minute delay for a middle vigilance level or a 15 minute delay for a high vigilance level. Stated differently, the vigilance management system 300 can use the vehicle operator vigilance level to determine (e.g., adjust) the frequency of one or more subsequent vigilance prompts. By providing subsequent vigilance prompts at a higher frequency, the vehicle operator's vigilance can be increased by stimulating the vehicle operator more frequently. Similarly, for vehicle operators with a high vigilance level, the frequency of subsequent vigilance prompts can, in some instances, be reduced, as the vehicle operator or may not require additional stimulation to maintain his/her vigilance.

In some implementations, the vehicle operator management action can be to determine (e.g., adjust) the type of one or more subsequent vigilance prompts. For example, certain vigilance prompts and their associated particular interactions may be better at stimulating and engaging the vehicle operator, and therefore more effective in maintaining the vehicle operator's vigilance. For example, in some implementations, analysis of a particular vehicle operator's profile may indicate that touching a display screen in response to a color change is more effective at increasing the vehicle operator vigilance level than pressing a button in response to an icon display. Accordingly, if the vehicle operator vigilance level is low, the test generator 325 can increase the frequency of the display screen touch vigilance prompt relative to the button press vigilance prompt. Similarly, for some vehicle operators, audio cues may be more effective in maintaining a vehicle operator vigilance level than visual cues, or vice-versa. Accordingly, if a vehicle operator vigilance level is low, the test generator 325 can provide audio cues rather than visual cues, or vice-versa. In this way, a vigilance management system 300 can determine a vigilance prompt based at least in part on the test output 315 and/or a vehicle operator vigilance level.

Similarly, in some implementations, the type of vigilance prompt can include both a visual cue and an audio cue. For example, if a vehicle operator vigilance level is low, such as following several consecutive vigilance prompts, the test generator 325 can escalate the type of vigilance prompt by concurrently providing both an audio cue and a visual cue with each vigilance prompt. By providing both a visual cue and an audio cue, the vehicle operator may be stimulated, and therefore have improved vigilance.

In some implementations, the test generator 325 can include a cognitive loading component 335 in a vigilance prompt. The cognitive loading component 335 can be, for example, a cognitive load aspect of a vigilance prompt which requires the vehicle operator to perform a more or less complicated task. For example, the variety of vigilance prompts and the amount of time between the vigilance prompts can be increased or reduced to increase or decrease the cognitive loading component 335 of one or more vigilance prompts. Similarly, more complex or less complex vigilance prompts can be provided, such as a sequence of interactions (e.g., a first action followed by a second action), etc. In some implementations, such as in a testing environment, the cognitive loading component 335 can be used to normalize vehicle operator response times. For example, reduced cognitive loading components 335 can improve vehicle operator response times, while increased cognitive loading components 335 can slow vehicle operator response times. In this way, individual vehicle operator performance can be normalized, which can help prevent testing results from being skewed by hyper-vigilant vehicle operators.

The test generator 325 can then provide the vigilance prompts to the prompt display and interaction 305. For example, in some implementations, the test generator 325 can preload a vigilance prompt in the prompt display and interaction 305 by spooling 340 the prompt (also referred to as a test). The test generator can then provide a trigger 345 to the test display and interaction 305 at an appropriate time for the vigilance prompt to be provided to the vehicle operator. For example, the spooling 340 can preload a vigilance prompt, which can then be provided when the trigger 345 is received.

In some implementations, the vehicle management system 300 can implement other vehicle operator management actions. For example, in some implementations, the vehicle operator can be provided feedback on the vehicle operator vigilance level. For example, the vehicle management system 300 can display or audibly play an indicator of the vehicle operator vigilance level (e.g., a numerical value, score, percentage, accuracy, response time, or category, such as pass/fail, high/low, etc.). In some implementations, a vehicle operator vigilance level for a particular vigilance prompt can be provided, such as an indication of the accuracy or response time following a response to a particular vigilance prompt. In some implementations, the vehicle operator vigilance level can track a vehicle operator's vigilance over a plurality of vigilance prompts, which can indicate whether a vehicle operator's vigilance is improving or decreasing. By providing the vehicle operator with feedback on the vehicle operator vigilance level, the vehicle operator's interest and motivation to perform well may cause the vehicle operator to become more vigilant.

In some implementations, the vehicle operator management action can include operating the autonomous vehicle to a safe state in which autonomous operation is disabled. For example, if a vehicle operator's vigilance level is too low, such as following a failure to respond to one or more consecutive vigilance prompts, the vigilance management system 300 can implement a motion plan to operate the vehicle to a safe state, such as navigating the autonomous vehicle to a stop in a parking lot, and autonomous operation can be disabled. For example, the vehicle operator can be prevented from causing the autonomous vehicle to enter an autonomous operation mode until a reset has occurred, such as after the vehicle operator has been contacted by an external vehicle operator management system, as disclosed herein. Further, the vehicle operator may only be able to operate the autonomous vehicle in a manual operating mode until the reset has occurred.

Similarly, in some implementations, the autonomous vehicle may be configured to operate autonomously for one or more discrete portions of a motion plan, and at the end of each portion, the vehicle operator may be required to engage or reengage autonomous operation before the autonomous vehicle proceeds to initiate travel in accordance with the motion plan. If the vehicle operator vigilance level is too low, in some implementations, the vehicle operator may be prevented from causing the autonomous vehicle to enter an autonomous operating mode. In some implementations, the autonomous vehicle can be disengaged from an autonomous operating mode in response to a low vehicle operator vigilance level.

In some implementations, a vehicle operator management action can include contacting an external vehicle operator management system. For example, an autonomous vehicle can include a communication system configured to communicate with an external vehicle operator management system. The external vehicle operator management system can be remote from the vehicle, and can provide various services such as security services, emergency services, roadside assistance, remote diagnostics, and/or communication services, such as with an emergency operator. In some implementations, the external vehicle operator management system can assist the vehicle operator and/or remotely diagnose one or more issues with the autonomous vehicle. For example, if a vehicle operator vigilance level is low, a remote operator can ask the vehicle operator if there is anything in particular affecting the vehicle operator's ability to respond to vigilance prompts. For example, external weather conditions or traffic conditions may impair a vehicle operator's ability to respond to vigilance prompts due to the vehicle operator paying close attention to the conditions in which the autonomous vehicle is operating. Similarly, a vehicle operator input device, such as a microphone, may be malfunctioning, and the external vehicle operator management system may be able to remotely diagnose such malfunctions. In such situations, the external vehicle operator management system can determine that the vehicle operator's vigilance level should not prevent the vehicle operator from causing the vehicle to enter or continue operating in an autonomous operating mode. Similarly, the external vehicle operator management system can reset or clear any disablement of autonomous operation, such as when the autonomous vehicle has been operated to a safe state or the vehicle operator has been prevented from causing the vehicle to enter an autonomous operating mode.

In some implementations, the vehicle operator management action can include logging the vehicle operator vigilance level, such as for later analysis. For example, the vigilance management system 300 can locally store data indicative of the vehicle operator vigilance level, such as individual responses, response accuracy levels, response times, or other data related to or indicative of the vehicle operator vigilance level. The vigilance management system 300 can further be configured to communicate the logged data, such as over a communications network, to an external computing system. In some implementations, analysis can be performed on the logged data in order to identify ways to maintain and/or improve a vehicle operator vigilance level. For example, machine learned models can be used to identify effective vigilance prompts, both on an individual level (e.g., a particular vehicle operator profile) or over a plurality of vehicle operators (e.g., aggregated vehicle operator profiles).

Figure 4:
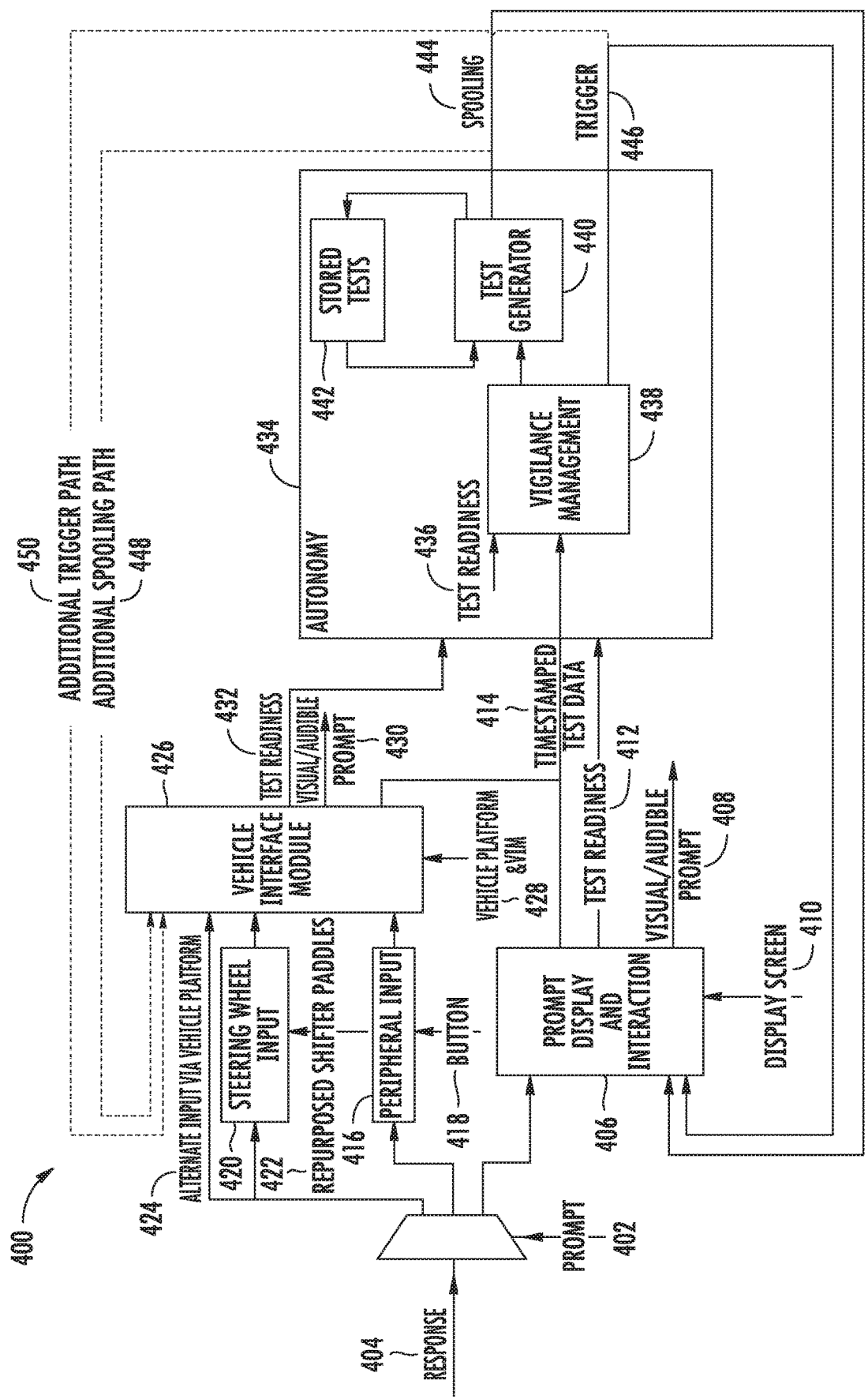
FIG. 4 depicts an example vigilance management system configuration according to example aspects of the present disclosure.

Referring now to FIG. 4, an example vigilance management system 400 according to example aspects of the present disclosure is depicted. The vigilance management system 400 can be implemented by one or more processors and one or more memory devices, such as, for example, a vehicle computing system 100. The vigilance management system 400 can be used to manage a vehicle operator's vigilance level by periodically testing the vehicle operator via one or more vigilance prompts.

Similar to vigilance management system 300, a vigilance prompt 402 can be provided and a response 404 can be received. For example, a prompt display and interaction 406 can be a visual and/or audible prompt 408, such as a vigilance prompt 402 displayed on a display screen 410. In some implementations, the prompt display and interaction 406 can also receive a response 404 via the display screen 410. For example, the display screen 410 can be a touch-sensitive display screen, and a vehicle operator can provide a response 404 via the display screen 410 in response to the visual/audible prompt 408. In response to receiving a response 404, the prompt display and interaction 406 can provide timestamped test data 414. Further, the prompt display and interaction 406 can provide a test readiness 412. Test readiness 412 can be indicative of, for example, whether a vehicle operator is ready to be provided a vigilance prompt 402, such as how much time has elapsed since the vehicle operator was last provided a vigilance prompt 402 and/or the time the last vigilance prompt 402 was provided.

The response 404 can also be received from the vehicle operator via various vehicle operator input devices. For example, in some implementations, the response 404 can be received via a peripheral input 416. For example, a button 418 (e.g., a purpose-built button affixed to a steering wheel or other location) can receive the response 404, and provide the response 404 to a vehicle interface module 426. In some implementations, the response 404 can be received via a steering wheel input 420. For example, repurposed shifter paddles 422 can receive the response 404, and can provide the response to the vehicle interface module 426. In some implementations, the response 404 can be an alternate input received via a vehicle platform 424, such as turn indicator actuation, windshield wiper actuation, voice command received via a microphone, or other interaction with a vehicle platform 424.

Vehicle interface module 426 can be, for example, a vehicle controller and associated network (e.g., harnesses, connections, wires, etc.) to allow various components of a vehicle to interface (e.g., communicate), such as to control the motion of the autonomous vehicle. Various commands and data can be sent and received by the vehicle interface module 426. In some implementations, vehicle interface module 426 can provide a visual and/or audible prompt 430, such as over one or more speakers or display screens of the vehicle, etc. Vehicle interface module 426 can receive the responses 404 from the various vehicle operator input devices, as well as other inputs from the vehicle platform 428. Responsive to receiving a response 404, vehicle interface module 426 can provide timestamped test data 414 to vigilance management 438. Further, vehicle interface module 426 can provide a test readiness 432. As with test readiness 412, test readiness 432 can be indicative of whether a vehicle operator is ready to be provided a vigilance prompt 402, such as how much time has elapsed since the vehicle operator was last provided a vigilance prompt 402 and/or the time the last vigilance prompt 402 was provided.

Vigilance management 438 can receive the timestamped test data 414 from the vehicle interface module 426 and the prompt display and interaction 406. Vigilance management 438 can further receive test readiness 436, which can include test readiness 432, test readiness 412, and/or a test readiness from autonomy 434. Similar to test readiness 412 and 432, test readiness 436 can be indicative of, for example, whether a vehicle operator is ready to be provided a vigilance prompt 402, such as how much time has elapsed since the vehicle operator was last provided a vigilance prompt 402 and/or the time the last vigilance prompt 402 was provided. Test readiness 436 can also include data from autonomy 434, such as data indicative of a motion plan for the autonomous vehicle. For example, in some implementations, vigilance management 438 can determine from test readiness 436 whether any pending lane changes or turns within a testing period are planned in the motion plan. The testing period can be, for example, the time needed to provide a vigilance test, including providing a vigilance prompt 402 and receiving a response 404. Further, in some implementations, vigilance management 438 can determine whether the autonomous vehicle is operating within an authorized area, such as an area in which providing vigilance prompts 402 to a vehicle operator are allowed. In some implementations, if the autonomous vehicle is operating within an authorized area without any pending turns or lane changes within a testing period, vigilance management 438 can determine that the vehicle operator is ready to be provided a vigilance prompt 402. In some implementations, if the vehicle operator has not been provided a previous vigilance prompt 402 within a threshold time period, vigilance management 438 can determine that the vehicle operator is ready to be provided a vigilance prompt 402.

Vigilance management 438 can use a test generator 440 to generate the one or more subsequent vigilance prompts 402. For example, the test generator 440 can access stored tests 442 (e.g., a test database), which can include a variety of vigilance prompts 402. The test generator 440 can determine how often the one or more subsequent vigilance prompts 402 can be provided, as well as a type of vigilance prompt 402 to provide. For example, the test generator 440 can determine the one or more subsequent vigilance prompts 402 and one or more intervals at which they are provided based at least in part on a vigilance level, a random selection, a pattern, a vehicle operator profile, and/or other factors, as described herein. Stated differently, test generator 440 can determine and/or adjust a frequency of one or more subsequent vigilance prompts 402. Test generator 440 can further determine and/or adjust the type of one or more subsequent vigilance prompts 402, such as which vigilance prompt 402 is provided at a particular time. In some implementations, a vigilance prompt 402 can also include a cognitive loading component, as described herein (not shown).

The test generator 440 can then provide the vigilance prompts 402 to the prompt display and interaction 406 and the vehicle interface module 426. For example, in some implementations, the test generator 440 can preload a vigilance prompt 402 in the prompt display and interaction 406 by spooling 444 the vigilance prompt 402. The test generator 440 can then provide a trigger 446 to the test display and interaction 406 an appropriate time for the vigilance prompt 402 to be provided to the vehicle operator. For example, the spooling 444 can preload a vigilance prompt 402, which can then be provided when the trigger 446 is received. Additional spooling path 448 and additional trigger path 450 can likewise be used by test generator 440 to spool and trigger, respectively, a vigilance prompt 402 via a vehicle interface module 426.

Vigilance management system 400 can further be configured to provide additional vehicle operator management actions, such as providing a vehicle operator with vigilance level feedback, operating and autonomous vehicle to a safe state in which autonomous operation is disabled, preventing the vehicle operator from causing the autonomous vehicle to enter an autonomous operating mode, contacting an external vehicle operator management system, or logging the vehicle operator vigilance level, as disclosed herein.

Figure 5:
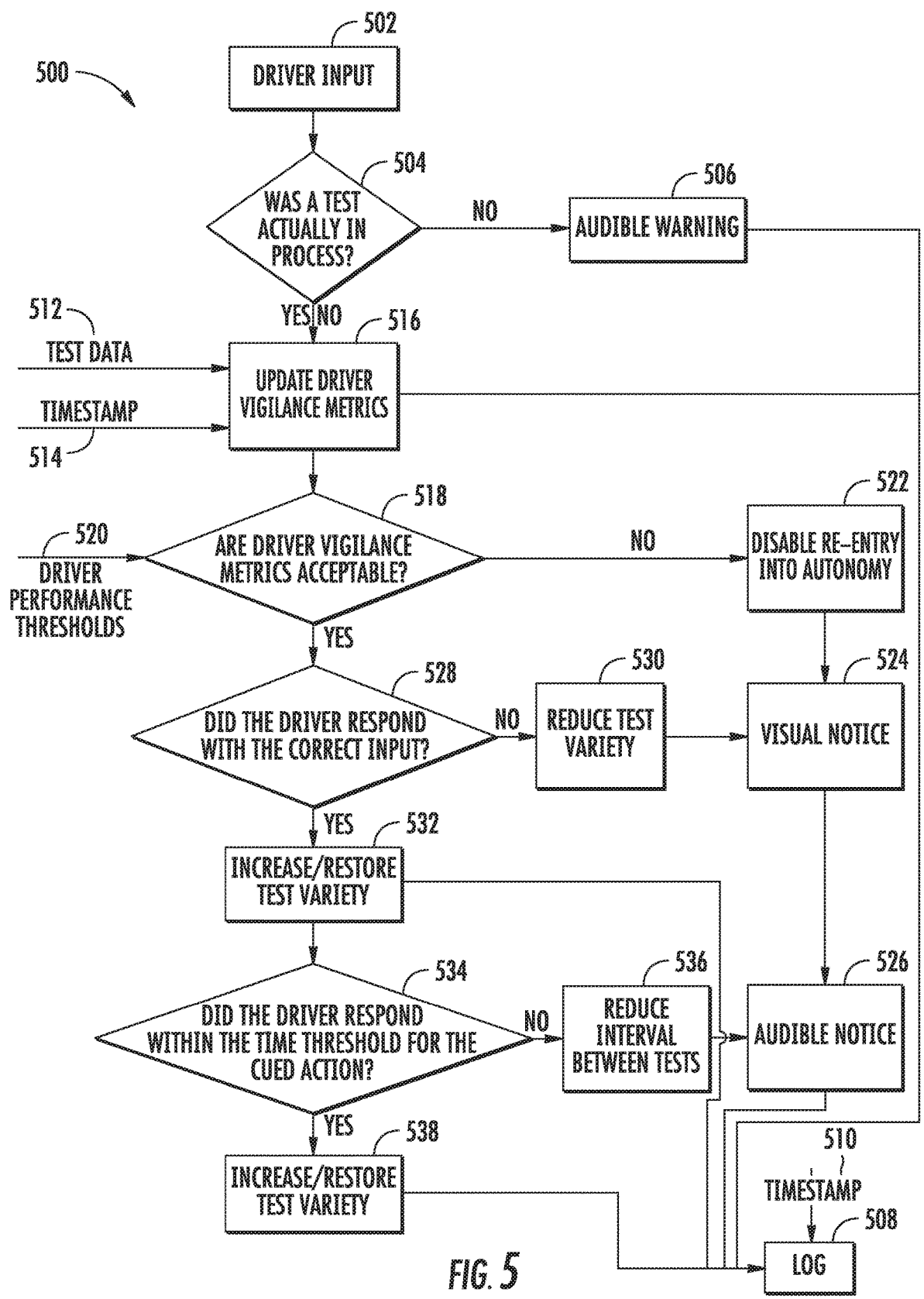
FIG. 5 depicts an example vehicle operator vigilance management process according to example aspects of the present disclosure.

Referring now to FIG. 5, an example vehicle operator vigilance management process 500 according to example aspects of the present disclosure is depicted. The vehicle operator vigilance management process 500 can be implemented by one or more processors and one or more memory devices, such as, for example, a vehicle computing system 100 and/or a vigilance management system 300/400 operating thereon. The vehicle operator vigilance management process 500 can be used, for example, to manage a vehicle operator's vigilance level by periodically testing the vehicle operator via one or more vigilance prompts.

As shown, driver input 502 (also referred to as vehicle operator response 502) can be received. For example, a vehicle operator can provide a response to a vigilance prompt via a vehicle operator input device.

At 504, it can be determined whether a test was actually in process (e.g., whether a vigilance prompt had been provided). If not, the vehicle operator can be provided a warning 506, such as an audible warning 506. Further, the vehicle operator response 502 can be logged at 508. For example, data indicative of the vehicle operator response 502 can be stored locally on a memory of an onboard computing system or communicated to an external computing system. A timestamp 510 can similarly be logged at 508, which can indicate a time at which the vehicle operator response 502 was received.

Whether or not a test was in progress at 504, the vehicle operator response 502, test data 512, and a timestamp 514 can be used to update vehicle operator vigilance metrics 516. For example, in some implementations, the vehicle operator vigilance metrics 516 can be or otherwise include a vehicle operator vigilance level, as disclosed herein. The updated vehicle operator vigilance metrics 516 can be determined based at least in part on, for example, an accuracy of the vehicle operator response 502 and/or a response time of the vehicle operator response 502. The updated vehicle operator vigilance metrics 516 can also be logged at 508. For example, data indicative of updated vehicle operator metrics 516 can be stored locally on a memory of an onboard computing system or communicated to an external computing system. The timestamp 514 and test data 512 can also be logged at 508.

At 518, the updated vehicle operator vigilance metrics 516 can be compared to one or more driver performance thresholds 520 (also referred to as vehicle operator performance thresholds 520). For example, it can be determined whether the updated vehicle operator vigilance metrics 516 are acceptable. The vehicle operator performance thresholds 520 can be, for example, vehicle operator performance thresholds 520 determined for specific drivers, operational areas (e.g., geographical areas), or other vehicle operator performance thresholds 520. In various implementations, heuristics, ranges, thresholds, fuzzy logic, and/or machine-learned models can be used to determine whether a vehicle operator's vigilance metrics 516 are acceptable. In some implementations, the vehicle operator performance thresholds 520 can be static thresholds (e.g., thresholds which do not change), while in other implementations, the vehicle operator performance thresholds 520 can be dynamic thresholds (e.g., thresholds which can be varied depending on various factors).

If at 518 it is determined that the vehicle operator vigilance metrics 516 are not acceptable, at 522, re-entry (or entry) into autonomous operation can be disabled. For example, in some implementations, the autonomous vehicle may be configured to operate autonomously for one or more discrete portions of a motion plan, and at the end of each portion, the vehicle operator may be required to cause the autonomous vehicle to engage or reengage autonomous operation before the autonomous vehicle proceeds to initiate travel in accordance with the motion plan. In some implementations, if the vehicle operator vigilance metrics 516 are not acceptable, the autonomous vehicle can be disengaged from an autonomous operating mode, such as by alerting the vehicle operator to a forthcoming disengagement of the autonomous operator mode and navigating the autonomous vehicle to a safe state prior to disengaging autonomous operation. If the updated vehicle operator vigilance metrics 516 are too low (e.g., not acceptable), in some implementations, the vehicle operator may be prevented from causing the autonomous vehicle to enter (or re-enter) an autonomous operating mode. In some implementations, the vehicle operator may only be able to manually control the autonomous vehicle. In some implementations, the autonomous vehicle can be operated to a safe state and disabled, as disclosed herein. At 524, the vehicle operator can be provided a visual notice that entry (or re-entry) into autonomous operation has been disabled. At 526, the vehicle operator can be provided an audible notice at entry (or re-entry) into autonomous operation has been disabled. The visual notice 524 and/or audible notice 526 can also be logged at 508, which can include a timestamp 510 of when the notices 524/526 were provided.

If at 518 the vehicle operator vigilance metrics 516 are acceptable, at 528, it can be determined whether the vehicle operator responded with the correct input. If not, in some implementations, at 530, the variety of subsequent vigilance prompts to be provided to the vehicle operator can be reduced. For example, the types of prompts which may be provided in subsequent tests can be limited to only certain vigilance prompts. Further, at 524 and/or 526, a visual notice and/or audible notice, respectively, can be provided to the vehicle operator indicating that the driver did not respond with the correct input. The visual notice 524 and/or audible notice 526 can also be logged at 508, which can include a timestamp 510 of when the notices 524/526 were provided.

If at 528 the vehicle operator responded with the correct input, at 532, test varieties can be restored. For example, the full variety of possible vigilance prompts can be used in subsequent tests. At 534, it can be determined whether the vehicle operator responded within a time threshold for the cued action (e.g., whether the vehicle operator's response time was less than the time threshold). If not, at 536, in some implementations, the interval between subsequent prompts can be reduced. For example, subsequent prompts can be provided at an increased frequency. Further, at 526, an audible notice can be provided to the vehicle operator indicating that the driver did not respond within the time threshold. The audible notice 526 can also be logged at 508, which can include a timestamp 510 of when the audible notice 526 was provided. In some implementations, a visual notice 524 can similarly be provided and logged at 508.

If at 534 the vehicle operator responded within the time threshold for the cued action, then at 538, test intervals and varieties can be increased and/or restored. For example, the interval between tests (e.g., providing subsequent vigilance prompts and receiving subsequent responses) can be increased back to a nominal time period. The increased/restored test interval 538 can be logged a 508, which can include a timestamp 510 of when the increased/restored test interval 538 was implemented.

Figure 6:
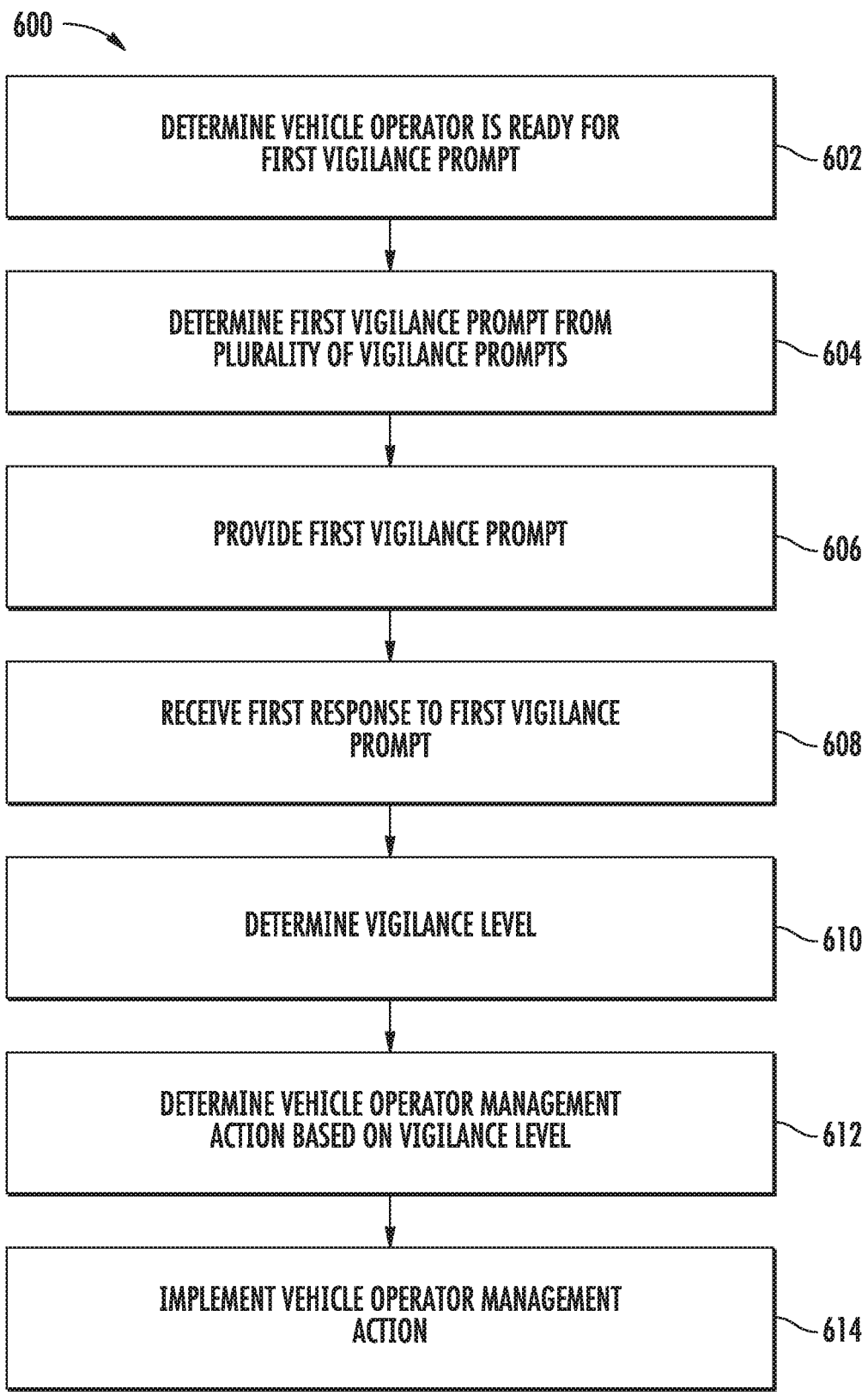
FIG. 6 depicts an example method according to example aspects of the present disclosure.

Referring now to FIG. 6, an example method (600) for determining a vigilance level of a vehicle operator in an autonomous vehicle according to example aspects of the present disclosure is depicted. Although FIG. 6 depicts steps performed in a particular order for purposes of illustration and discussion, the methods of the present disclosure are not limited to the particularly illustrated order or arrangement. The various steps of method (600) can be omitted, rearranged, combined, and/or adapted in various ways without deviating from the scope of the present disclosure. The method (600) can be implemented by one or more processors and one or more tangible, non-transitory computer-readable memory.

At (602), the method (600) can include determining a vehicle operator is ready for a first vigilance prompt. For example, in some implementations, determining that the vehicle operator is ready for a first vigilance prompt can include determining that the autonomous vehicle is operating within an authorized area without any pending turns or lane changes within a testing period. In some implementations, determining that the vehicle operator is ready to be provided the first vigilance prompt can include determining that the vehicle operator has not been provided a previous vigilance prompt within a threshold time period.

At (604), the method (600) can include determining a first vigilance prompt from a plurality of vigilance prompts. For example, the first vigilance prompt can be a visual cue, such as a visual cue displayed on a display screen of an autonomous vehicle and/or an audio cue played by a speaker of the autonomous vehicle. For example, visual cue can be a color change, an icon display, or a text command, which can be displayed on the display screen. Each of the plurality of vigilance prompts can be different from each other vigilance prompt, and can be a prompt for the vehicle operator to perform a particular interaction with the autonomous vehicle. For example, in some implementations, the particular interaction can be a button push, a display screen touch, a shifter paddle actuation, a turn indicator actuation, a windshield wiper actuation, or a verbal response.

At (606), the method (600) can include providing the first vigilance prompt. For example, the first vigilance prompt can be displayed on the display screen or audibly played for the vehicle operator by a speaker of the autonomous vehicle.

At (608), the method (600) can include receiving a first response to the first vigilance prompt. For example, the vehicle operator can perform the particular interaction prompted by the first vigilance prompt. The first response can be received by a vehicle operator input device.

At (610), the method (600) can include determining a vehicle operator vigilance level based at least in part on the first response. For example, in some implementations, the vehicle operator vigilance level can be determined based at least in part on an accuracy of the first response or a response time of the first response. In some implementations, the vigilance level can be expressed as a numerical value (e.g., on a scale), a percentage, or other suitable format. In some implementations, the vigilance level can be expressed as category (e.g. pass/fail, high/medium/low, responsive/non-responsive, etc.). In some implementations, the vigilance level can be determined based on a plurality of vehicle operator responses, such as a plurality of the most recently received responses (e.g., a mean, median, rolling window, etc.). In some implementations, a plurality of vehicle operator responses can be weighted differently. For example, more recently provided responses may be weighted more than older responses. In some implementations, a vigilance level can include a historical vigilance level component, such as an average over a plurality of vigilance prompts and responses, as well as a recent vigilance level component, such as one or more of the most recent prompts and responses. Thus, in some implementations, the vigilance level can be indicative of the overall alertness and vigilance of the vehicle operator, both historically as well as at a particular time. In some implementations, each vehicle operator can have an associated profile, and respective vehicle operator vigilance levels can be tracked over time, such as over a plurality of autonomous driving sessions.

At (612), the method (600) can include determining a vehicle operator management action based at least in part on the vigilance level. For example, in some implementations, the vehicle operator management action can include determining or adjusting a frequency of one or more subsequent vigilance prompts, determining or adjusting a type of one or more subsequent vigilance prompts, providing the vehicle operator with vigilance level feedback, operating the autonomous vehicle to a safe state in which autonomous operation is disabled, preventing the vehicle operator from causing the autonomous vehicle to enter an autonomous operating mode, contacting an external vehicle operator management system, or logging the vehicle operator vigilance level. The vehicle operator management action can then be implemented at (614).

Figure 7:
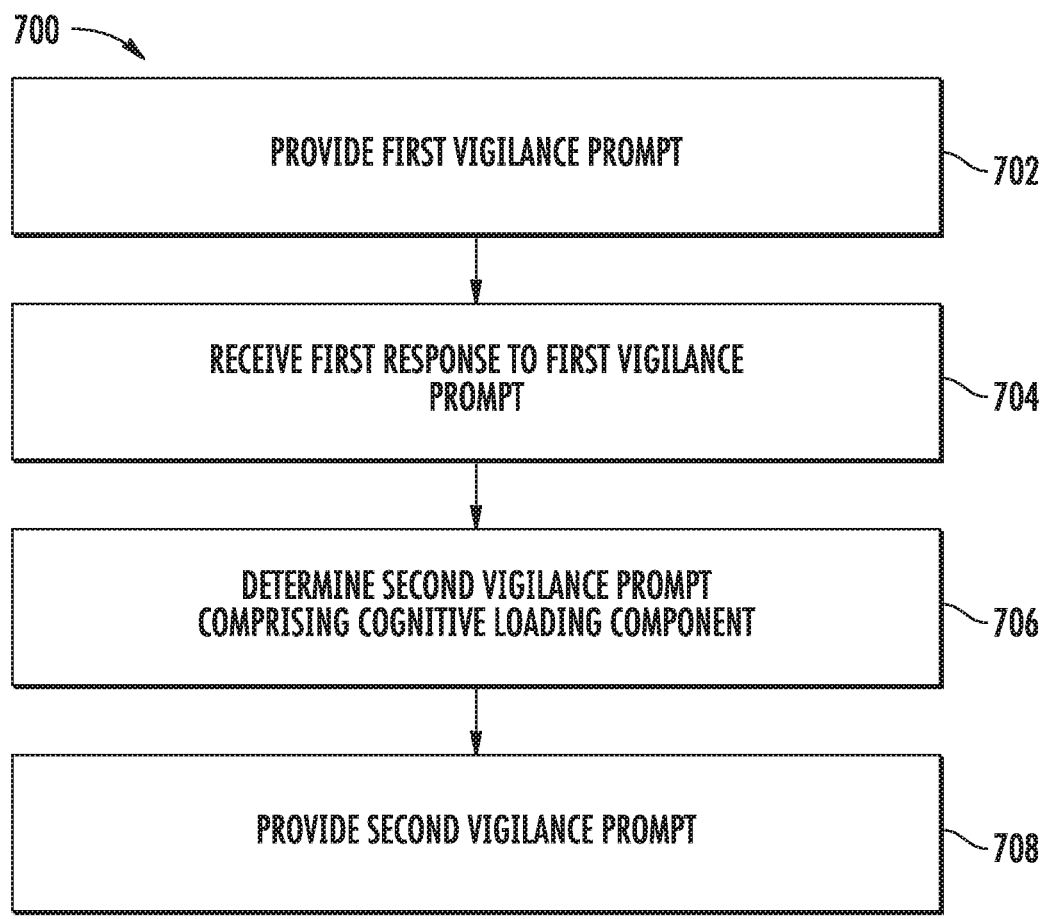
FIG. 7 depicts an example method according to example aspects of the present disclosure.

Referring now to FIG. 7, an example method (700) according to example aspects of the present disclosure is depicted. Although FIG. 7 depicts steps performed in a particular order for purposes of illustration and discussion, the methods of the present disclosure are not limited to the particularly illustrated order or arrangement. The various steps of method (700) can be omitted, rearranged, combined, and/or adapted in various ways without deviating from the scope of the present disclosure. Method (700) can be implemented in an autonomous vehicle configured to operate in a non-public testing environment, such as on an isolated testing track, by one or more processors and one or more tangible, non-transitory computer-readable memory of the autonomous vehicle.

At (702), the method (700) can include providing a first vigilance prompt. For example, the first vigilance prompt can be displayed on the display screen or audibly played for the vehicle operator by a speaker of the autonomous vehicle. The first vigilance prompt can be a visual cue, such as a visual cue displayed on a display screen of an autonomous vehicle, and/or an audio cue played by a speaker of the autonomous vehicle. For example, a visual cue can be a color change, an icon display, or a text command, which can be displayed on the display screen. The first vigilance prompt can be a prompt for the vehicle operator to perform a particular interaction with the autonomous vehicle. For example, in some implementations, the particular interaction can be a button push, a display screen touch, a shifter paddle actuation, a turn indicator actuation, a windshield wiper actuation, or a verbal response.

At (704), the method (700) can include receiving a first response to the first vigilance prompt. For example, the vehicle operator can perform the particular interaction prompted by the first vigilance prompt. The first response can be received by a vehicle operator input device.

At (706), the method (700) can include determining a second vigilance prompt comprising a cognitive loading component based at least in part on the first response. For example, the cognitive loading component can be a cognitive load aspect of a vigilance prompt which requires the vehicle operator to perform a more or less complicated task. For example, rather than pushing a button, the vehicle operator may be required to press a sequence of buttons, solve a mathematical question and provide a verbal response, or perform some other cognitive task. Similarly, in some implementations, the second vigilance prompt can be selected from a variety of vigilance prompts, and the variety of vigilance prompts can be narrowed or increased based at least in part on the first response. Further, in some implementations, the amount of time between the first vigilance prompt and the second vigilance prompt can be increased or decreased, such as from a nominal time, based at least in part on the first response.

At (708), the method (700) can include providing the second vigilance prompt. For example, the second vigilance prompt can be displayed on the display screen or audibly played for the vehicle operator by a speaker of the autonomous vehicle.

Figure 8:
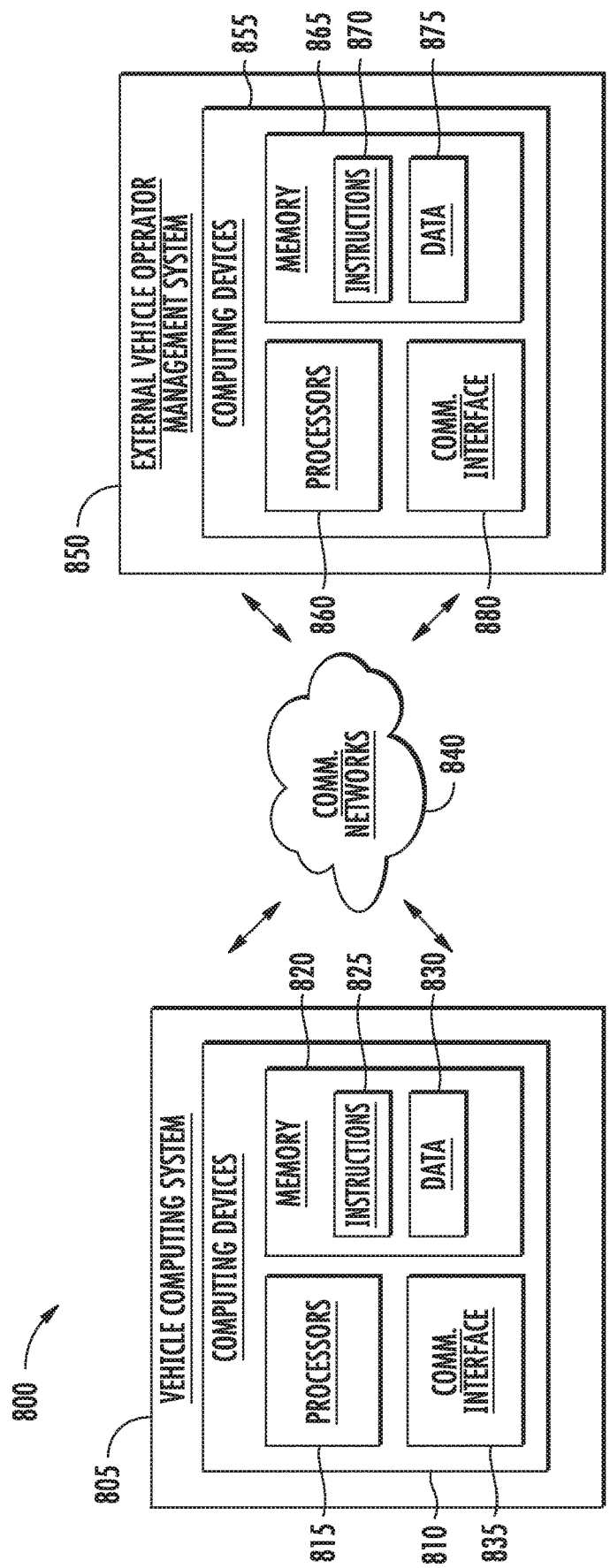
FIG. 8 depicts example system components according to example aspects of the present disclosure.

FIG. 8 depicts an example system 800 according to example embodiments of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The example system 800 can include a vehicle computing system 805 of a vehicle. The vehicle computing system 805 can represent/correspond to the vehicle computing system 100 described herein. The example system 800 can include a remote computing system 850 (e.g., that is remote from the vehicle computing system). The remote computing system 850 can represent/correspond to an external vehicle operator management system described herein. The vehicle computing system 805 and the remote computing system 850 can be communicatively coupled to one another over one or more network(s) 840.

The computing device(s) 810 of the vehicle computing system 805 can include processor(s) 815 and a memory 820. The one or more processors 815 can be any suitable processing device (e.g., a processor core, a microprocessor, an ASIC, a FPGA, a controller, a microcontroller, etc.) and can be one processor or a plurality of processors that are operatively connected. The memory 820 can include one or more non-transitory computer-readable storage media, such as RAM, ROM, EEPROM, EPROM, one or more memory devices, flash memory devices, data registrar, etc., and combinations thereof.

The memory 820 can store information that can be accessed by the one or more processors 815. For instance, the memory 820 (e.g., one or more non-transitory computer-readable storage mediums, memory devices) on-board the vehicle can include computer-readable instructions 825 that can be executed by the one or more processors 815. The instructions 825 can be software written in any suitable programming language or can be implemented in hardware.

Additionally, or alternatively, the instructions 825 can be executed in logically and/or virtually separate threads on processor(s) 815.

For example, the memory 820 can store instructions 825 that when executed by the one or more processors 815 cause the one or more processors 815 (the vehicle computing system 805) to perform operations such as any of the operations and functions of the vehicle computing system 100 (or for which it is configured), one or more of the operations and functions of the operations computing systems described herein (or for which it is configured), one or more of the operations and functions for determining vehicle operator vigilance levels described herein, one or more portions of methods 600 and 700 described herein, and/or one or more of the other operations and functions of the computing systems or vehicle operator vigilance management systems described herein.

The memory 820 can store data 830 that can be obtained (e.g., acquired, received, retrieved, accessed, created, stored, etc.). The data 830 can include, for instance, sensor data, map data, vehicle state data, perception data, prediction data, motion planning data, vigilance level data, test databases (e.g., stored tests), timestamped test data, vigilance prompt data, and/or other data/information such as, for example, that described herein. In some implementations, the computing device(s) 810 can obtain data from one or more memories that are remote from the vehicle computing system 805.

The computing device(s) 810 can also include a communication interface 835 used to communicate with one or more other system(s) on-board a vehicle and/or a remote computing device that is remote from the vehicle (e.g., of the system 850). The communication interface 835 can include any circuits, components, software, etc. for communicating via one or more networks (e.g., network(s) 840). The communication interface 835 can include, for example, one or more of a communications controller, receiver, transceiver, transmitter, port, conductors, software and/or hardware for communicating data.

The remote computing system 850 can include one or more computing device(s) 855 that are remote from the vehicle computing system 805. The computing device(s) 855 can include one or more processors 860 and a memory 865. The one or more processors 860 can be any suitable processing device (e.g., a processor core, a microprocessor, an ASIC, a FPGA, a controller, a microcontroller, etc.) and can be one processor or a plurality of processors that are operatively connected. The memory 865 can include one or more tangible, non-transitory computer-readable storage media, such as RAM, ROM, EEPROM, EPROM, one or more memory devices, flash memory devices, data registrar, etc., and combinations thereof.

The memory 865 can store information that can be accessed by the one or more processors 860. For instance, the memory 865 (e.g., one or more tangible, non-transitory computer-readable storage media, one or more memory devices, etc.) can include computer-readable instructions 870 that can be executed by the one or more processors 860. The instructions 870 can be software written in any suitable programming language or can be implemented in hardware. Additionally, or alternatively, the instructions 870 can be executed in logically and/or virtually separate threads on processor(s) 860.

For example, the memory 865 can store instructions 870 that when executed by the one or more processors 860 cause the one or more processors 860 to perform operations. For example, the operations can include operations to analyze vigilance test data (e.g., test output data, test databases, stored tests, cognitive load components), analyze vehicle operator vigilance levels, disable autonomous operation on an autonomous vehicle, and/or prevent a vehicle operator from causing an autonomous vehicle from entering or reentering an autonomous operating mode.

The memory 865 can store data 875 that can be obtained. The data 875 can include, can include, for instance, sensor data, map data, vehicle state data, perception data, prediction data, motion planning data, vigilance level data, timestamped test data, vigilance prompt data, and/or other data/information described herein.

The computing device(s) 855 can also include a communication interface 880 used to communicate with one or more system(s) onboard a vehicle and/or another computing device that is remote from the system 850. The communication interface 880 can include any circuits, components, software, etc. for communicating via one or more networks (e.g., network(s) 840). The communication interface 880 can include, for example, one or more of a communications controller, receiver, transceiver, transmitter, port, conductors, software and/or hardware for communicating data.

The network(s) 840 can be any type of network or combination of networks that allows for communication between devices. In some embodiments, the network(s) 840 can include one or more of a local area network, wide area network, the Internet, secure network, cellular network, mesh network, peer-to-peer communication link and/or some combination thereof and can include any number of wired or wireless links. Communication over the network(s) 840 can be accomplished, for instance, via a communication interface using any type of protocol, protection scheme, encoding, format, packaging, etc.

For example, the vehicle computing system 805 can communicate with external vehicle operator management system 850 over network(s) 840. The external vehicle operator management system 850 can be remote from the vehicle computing system 805, and can provide various services such as security services, emergency services, roadside assistance, remote diagnostics, and/or communication services, such as with an emergency operator.

In some implementations, the external vehicle operator management system 850 can perform analysis on logged data in order to identify ways to maintain and/or improve a vehicle operator vigilance level. For example, machine learned models can be used to identify effective vigilance prompts, both on an individual level (e.g., a particular vehicle operator profile) or over a plurality of vehicle operators (e.g., aggregated vehicle operator profiles).

In some implementations, the external vehicle operator management system 850 can determine an autonomous vehicle should be operated to a safe state in which autonomous operation is disabled. For example, a vehicle operator's vigilance level may be too low, and the external vehicle operator management system 850 can communicate a motion plan command to the vehicle computing system 805 in order to cause the autonomous vehicle to travel to a safe state in which autonomous operation is disabled, such as in a parking lot. Similarly, the external vehicle operator management system 850 can communicate a motion plan command that prevents a vehicle operator from causing the autonomous vehicle from entering or reentering an autonomous operating mode, as described herein. For example, the autonomous vehicle may be configured to operate autonomously for one or more discrete portions of a motion plan, and at the end of each portion, the vehicle operator may be required to engage or reengage autonomous operation before the autonomous vehicle proceeds to initiate travel in accordance with the motion plan. If the vehicle operator vigilance level is too low, in some implementations, the vehicle operator may be prevented from causing the autonomous vehicle to enter an autonomous operating mode.

In some implementations, the external vehicle operator management system 850 can assist the vehicle operator and/or remotely diagnose one or more issues with the autonomous vehicle. For example, if a vehicle operator vigilance level is low, a remote operator can ask the vehicle operator if there is anything in particular affecting the vehicle operator's ability to respond to vigilance prompts. For example, external weather conditions or traffic conditions may impair a vehicle operator's ability to respond to vigilance prompts due to the vehicle operator paying close attention to the conditions in which the autonomous vehicle is operating. Similarly, a vehicle operator input device, such as a microphone, may be malfunctioning, and the external vehicle operator management system 850 may be able to remotely diagnose such malfunctions. In such situations, the external vehicle operator management system 850 can determine that the vehicle operator's vigilance level should not prevent the vehicle operator from causing the vehicle to enter or continue operating in an autonomous operating mode. Similarly, the external vehicle operator management system 850 can reset or clear any disablement of autonomous operation, such as when the autonomous vehicle has been operated to a safe state or the vehicle operator has been prevented from causing the vehicle to enter an autonomous operating mode.

Computing tasks, operations, and functions discussed herein as being performed at a vehicle (e.g., via the vehicle computing system) can instead be performed by computing device(s) that are remote from the vehicle (e.g., via an external vehicle operator management system) and/or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The communications between computing systems described herein can occur directly between the systems or indirectly between the systems. For example, in some implementations, the computing systems can communicate via one or more intermediary computing systems. The intermediary computing systems may alter the communicated data in some manner before communicating it to another computing system.

The number and configuration of elements shown in the figures is not meant to be limiting. More or less of those elements and/or different configurations can be utilized in various embodiments.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for determining a vigilance level of a vehicle operator present in an autonomous vehicle; the autonomous vehicle configured to operate in a fully autonomous operating mode in which the autonomous vehicle drives and navigates with no input from the vehicle operator, comprising:

determining, by a computing system comprising one or more processors, a first vigilance prompt, wherein the first vigilance prompt is included in a plurality of vigilance prompts, wherein each of the plurality of vigilance prompts is different from each other vigilance prompt, wherein each vigilance prompt comprises a prompt for the vehicle operator to perform a particular interaction with the autonomous vehicle to stimulate and engage the vehicle operator while the autonomous vehicle is operating in the fully autonomous operating mode;

providing, by the computing system, the first vigilance prompt to a vehicle operator of an autonomous vehicle while the autonomous vehicle is operating in the fully autonomous operating mode;

receiving, by the computing system, a first response from the vehicle operator in response to the first vigilance prompt while the autonomous vehicle is operating in the fully autonomous operating mode; and determining, by the computing system, a vehicle operator vigilance level indicative of the vigilance of the vehicle operator based at least in part on the first response.

2. The method of claim 1, wherein the first vigilance prompt comprises a visual cue displayed on a display screen of the autonomous vehicle or an audio cue played by a speaker of the autonomous vehicle.

3. The method of claim 2, wherein the visual cue comprises a color change, an icon display, or a text command.

4. The method of claim 1, wherein the particular interaction comprises at least one of a button push, a display screen touch, a shifter paddle actuation, a turn indicator actuation, a windshield wiper actuation, or a verbal response.

5. The method of claim 1, wherein the first response comprises a vehicle operator interaction and a response time; and wherein determining, by the computing system, the vehicle operator vigilance level based at least in part on the first response comprises determining, by the computing system, the vehicle operator vigilance level based at least in part on one or more of: a determination of whether the response time is less than a time threshold and a determination of whether the vehicle operator interaction is a correct interaction.

6. The method of claim 1, wherein, prior to determining, by the computing system, the first vigilance prompt, the method further comprises:

determining, by the computing system, that the vehicle operator is ready to be provided the first vigilance prompt.

7. The method of claim 6, wherein determining, by the computing system, that the vehicle operator is ready to be provided the first vigilance prompt comprises determining, by the computing system, that the autonomous vehicle is operating within an authorized area without any pending turns or lane changes within a testing period.

8. The method of claim 6, wherein determining, by the computing system, that the vehicle operator is ready to be provided the first vigilance prompt comprises determining, by the computing system, that the vehicle operator has not been provided a previous vigilance prompt within a threshold time period.

9. The method of claim 1, further comprising:
providing, by the computing system, a second vigilance prompt to the vehicle operator following a time delay.

10. The method of claim 9, wherein prior to providing, by the computing system, the second vigilance prompt, the method further comprises:
determining, by the computing system, the time delay based at least in part on the vehicle operator vigilance level.

11. The method of claim 9, wherein prior to providing, by the computing system, the second vigilance prompt, the method further comprises:
determining, by the computing system, a type of the second vigilance prompt based at least in part on the vehicle operator vigilance level.

12. The method of claim 9, wherein the autonomous vehicle is operating in a testing environment, wherein the method further comprises:
determining, by the computing system, a cognitive loading component based at least in part on the vehicle operator vigilance level; and
determining, by the computing system, the second vigilance prompt based at least in part on the cognitive loading component.

13. The method of claim 1, further comprising:
determining, by the computing system, a vehicle operator management action based at least in part on the vehicle operator vigilance level; and
implementing, by the computing system, the vehicle operator management action.

14. The method of claim 13, wherein the vehicle operator management action comprises at least one of: determining a frequency of one or more subsequent vigilance prompts, determining a type of one or more subsequent vigilance prompts, providing the vehicle operator with vigilance level feedback, operating the autonomous vehicle to a safe state in which autonomous operation is disabled, preventing the vehicle operator from causing the autonomous vehicle to enter an autonomous operating mode, contacting an external vehicle operator management system, or logging the vehicle operator vigilance level.

15. An autonomous vehicle operator vigilance management system, comprising:
one or more processors; and
one or more tangible, non-transitory, computer readable media that collectively store instructions that when executed by the one or more processors cause the one or more processors to perform operations comprising:
determining that a vehicle operator present in an autonomous vehicle is ready to be provided a first vigilance prompt, wherein the first vigilance prompt is included in a plurality of vigilance prompts, wherein each of the plurality of vigilance prompts is different from each other vigilance prompt, wherein each vigilance prompt comprises a prompt for the vehicle operator to perform a particular interaction with the autonomous vehicle to stimulate and engage the vehicle operator, wherein the autonomous vehicle is configured to operate in a fully autonomous operating mode in which the autonomous vehicle drives and navigates with no input from the vehicle operator;
determining the first vigilance prompt;
providing the first vigilance prompt to the vehicle operator of the autonomous vehicle while the autonomous vehicle is operating in the fully autonomous operating mode;
receiving a first response from the vehicle operator in response to the first vigilance prompt while the autonomous vehicle is operating in the fully autonomous operating mode; and
determining a vehicle operator vigilance level indicative of the vigilance of the vehicle operator based at least in part on the first response.

16. The autonomous vehicle operator vigilance management system of claim 15, wherein determining that the vehicle operator present in the autonomous vehicle is ready to be provided the first vigilance prompt comprises determining that the autonomous vehicle is operating within an authorized area without any pending turns or lane changes within a testing period and that the vehicle operator has not been provided a previous vigilance prompt within a threshold time period.

17. The autonomous vehicle operator vigilance management system of claim 15, wherein the first vigilance prompt comprises at least one of: a visual cue displayed on a display screen of the autonomous vehicle or an audio cue played by a speaker of the autonomous vehicle; and
wherein the particular interaction comprises at least one of: a button push, a display screen touch, a shifter paddle actuation, a turn indicator actuation, a windshield wiper actuation, or a verbal response.

18. The autonomous vehicle operator vigilance management system of claim 15, wherein the operations further comprise:
determining a vehicle operator management action based at least in part on the first response; and
implementing the vehicle operator management action.

19. The autonomous vehicle operator vigilance management system of claim 18, wherein the vehicle operator management action comprises at least one of: determining a frequency of one or more subsequent vigilance prompts, determining a type of one or more subsequent vigilance prompts, providing the vehicle operator with vigilance level feedback, operating the autonomous vehicle to a safe state in which autonomous operation is disabled, preventing the vehicle operator from causing the autonomous vehicle to enter an autonomous operating mode, contacting an external vehicle operator management system, or logging the vehicle operator vigilance level.

20. An autonomous vehicle configured to operate in a testing environment, the autonomous vehicle further configured to operate in a fully autonomous operating mode in which the autonomous vehicle drives and navigates with no input from the vehicle operator, the autonomous vehicle comprising:
a touch-sensitive display screen;
a speaker device;
one or more of vehicle operator input devices, the one or more vehicle operator input devices comprising one or more of: a button, a shifter paddle, a turn indicator, a windshield wiper, a microphone, or the touch-sensitive display screen; and
a vehicle operator testing normalization system, comprising:
one or more processors; and
one or more tangible, non-transitory, computer readable media that collectively store instructions that when executed by the one or more processors cause the vehicle operator testing normalization system to perform operations comprising:

providing a first vigilance prompt to a vehicle operator of the autonomous vehicle via at least one of the touch-sensitive display screen or the speaker device while the autonomous vehicle is operating in the fully autonomous operating mode, wherein the first vigilance prompt comprises a prompt for the vehicle operator to perform a particular interaction with at least one vehicle operator input device;

receiving a first response from the vehicle operator in response to the first vigilance prompt via the at least one vehicle operator device while the autonomous vehicle is operating in the fully autonomous operating mode, the first response comprising a vehicle operator interaction and a response time;

determining a second vigilance prompt based at least in part on the first response, the second vigilance prompt comprising a cognitive loading component; and providing the second vigilance prompt to the vehicle operator of the autonomous vehicle;

wherein the second vigilance prompt is determined based at least in part on one or more of: a determination of whether the response time is less than a time threshold and a determination of whether the vehicle operator interaction is a correct interaction.

* * * * *